US 7,469,578 B2

(12) United States Patent
Matsuda et al.

(10) Patent No.: US 7,469,578 B2
(45) Date of Patent: Dec. 30, 2008

(54) METHOD AND APPARATUS FOR EVALUATING A CORNERING STABILITY OF A WHEEL

(75) Inventors: Jun Matsuda, Kanagawa (JP); Tsuyoshi Kitazaki, Kanagawa (JP); Naoshi Miyashita, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 294 days.

(21) Appl. No.: 11/525,667

(22) Filed: Sep. 22, 2006

(65) Prior Publication Data

US 2007/0084276 A1    Apr. 19, 2007

(30) Foreign Application Priority Data

Sep. 27, 2005  (JP)  ............................. 2005-280387

(51) Int. Cl.
    G01M 17/02    (2006.01)
(52) U.S. Cl. ..................................................... 73/146
(58) Field of Classification Search ......... 73/146–146.8
    See application file for complete search history.

(56) References Cited

U.S. PATENT DOCUMENTS

| 7,404,317 B2* | 7/2008 | Mancosu et al. .............. 73/146 |
| 2005/0145025 A1 | 7/2005 | Fischer et al. | |

FOREIGN PATENT DOCUMENTS

| EP | 0 887 211 A1 | 12/1998 |
| EP | 1 516 751 A2 | 3/2005 |
| EP | 1 568 518 A2 | 8/2005 |
| JP | 08-121571 A | 5/1996 |
| JP | 08-198131 | 8/1996 |
| JP | 2004-359203 A | 12/2004 |
| JP | 2005-238961 A | 9/2005 |
| WO | WO 01/36241 A1 | 5/2001 |
| WO | WO 01/92078 A2 | 12/2001 |

OTHER PUBLICATIONS

European Search Report by European Patent Office on Jan. 19, 2007.

* cited by examiner

*Primary Examiner*—Edward Lefkowitz
*Assistant Examiner*—Jermaine Jenkins
(74) *Attorney, Agent, or Firm*—Knobbe Martens Olson & Bear LLP

(57) ABSTRACT

A method and apparatus derives a change amount in the cumulative value of displacement for the unit of time as a change ratio in tire deformation by using the cumulative value of displacement derived present time and the cumulative value of displacement derived last time, and calculate a rate of change ratio using the change ratio in tire deformation previously calculated as a reference value and the change ratio calculated present time, and determine a cornering stability of the wheel that represents a degree of a margin in which the wheel keeps no sliding and beyond which the wheel start sliding based on the rate of change ratio.

10 Claims, 14 Drawing Sheets

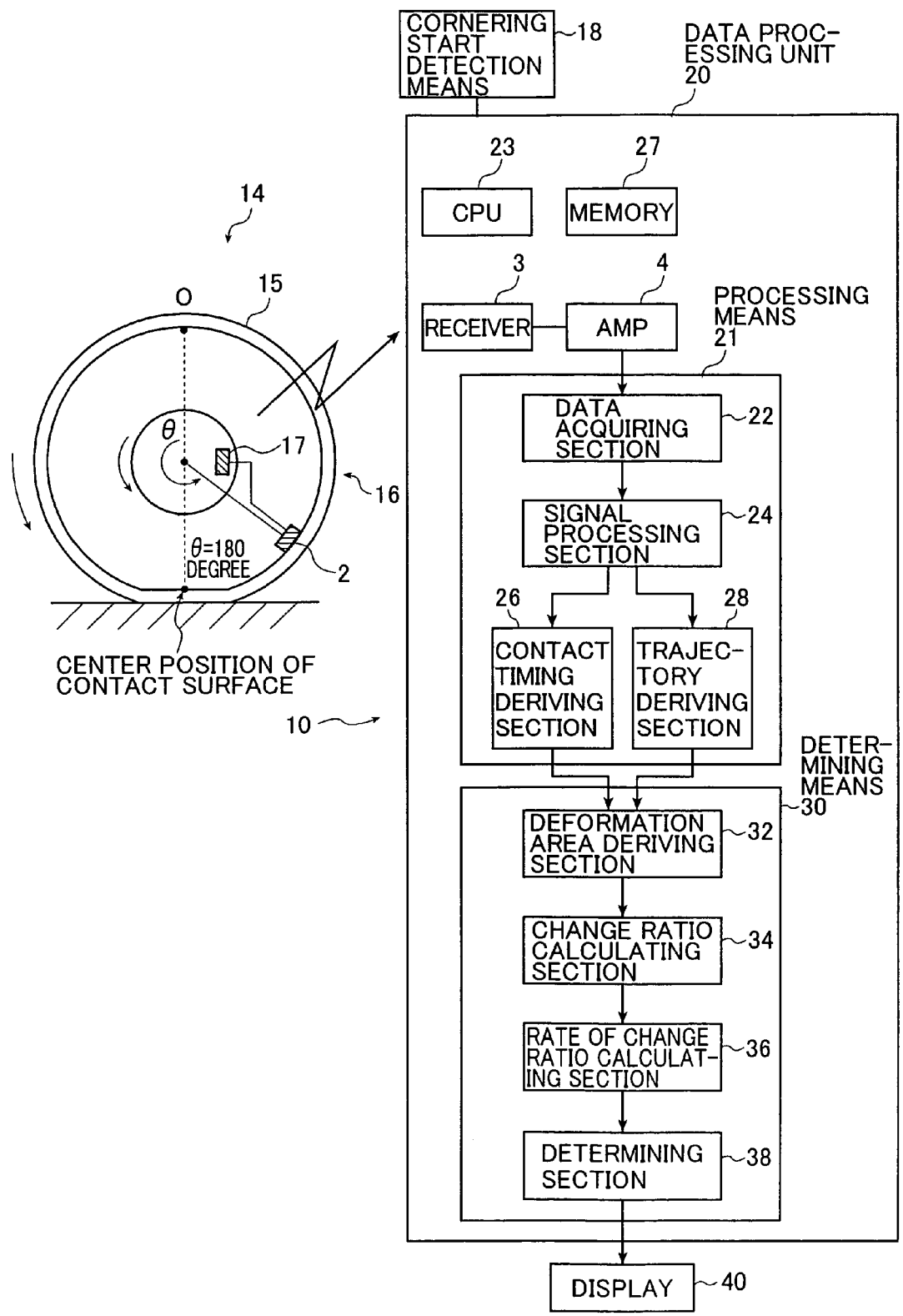

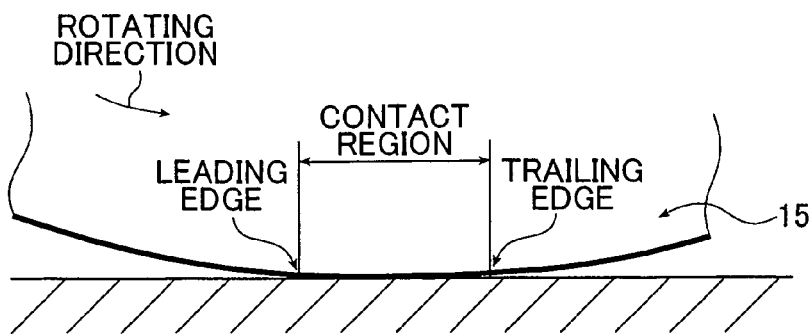
FIG.4A
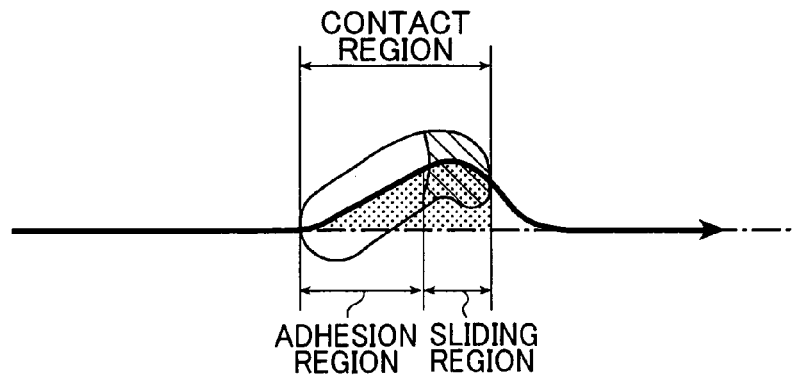
FIG.4B
FIG.5
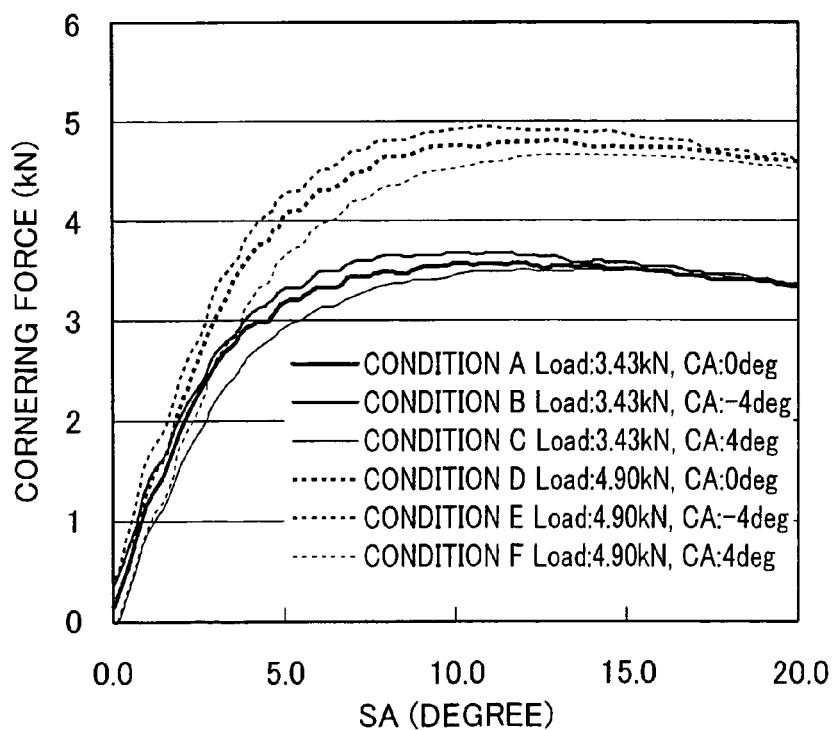

US 7,469,578 B2

METHOD AND APPARATUS FOR EVALUATING A CORNERING STABILITY OF A WHEEL

BACKGROUND OF THE INVENTION

The present invention relates to a method and a apparatus for evaluating a cornering stability of a wheel that determine whether or not the vehicle having wheels with tires mounted thereto has a margin in which the wheel keeps no sliding and beyond which the wheel start sliding, when the vehicle is cornering.

The cornering property is a key factor for the driveability of automobile vehicles. In order to design automobile vehicles or wheels that achieve higher driveability, it is important to evaluate the cornering property accurately. It has been known that the cornering forces applied to the wheel and the slip angle of the wheel during cornering are significantly related to the cornering property.

When an automobile vehicle is cornering, an equilibrium state is maintained between the sum of the forces towards the center of the cornering line (cornering forces) generated on the contact surfaces of the front and rear tires, and the centrifugal force of the vehicle. If such an equilibrium state is broken, and the centrifugal force of the vehicle exceeds sum of the generated cornering forces, the wheel makes a large slide and reaches a slip state. In the description, the slip state means a state in which the wheel slides to such a large extent that the driveability of the vehicle by the driver is extremely deteriorated. For an automobile vehicle provided with wheels to which tires are assembled, various factors are involved in its cornering property, including vehicle structure properties (e.g., weight, balance), suspension properties, tire properties, and road surface conditions. Therefore, the traveling conditions (slip conditions) in which a lateral sliding occurs in the wheels are specific to particular vehicles or tires. Knowing the cornering stability (a margin in which the wheel keeps no sliding and beyond which the wheel start sliding (safety margin to reach slip state)) of the wheel, as the cornering property of the automobile vehicle, under various traveling conditions is particularly important in designing automobile vehicles or wheels that achieve higher driveability.

As an example of methods of evaluating the cornering forces generated on a specific tire, a method that uses known indoor cornering test devices (e.g.,drum type test device or flatbelt type test device) has been described. In the description of the indoor cornering test devices, a specific tire is made in contact with a simulated road surface with the specific tire being loaded. Then, the specific tire is rotated while moving the virtual road surface and the specific tire relatively to each other, and the cornering forces generating on the contact surface are measured.

However, cornering forces generating on a tire which is actually mounted to a vehicle are affected by various factors, such as vehicle structure properties (e.g., weight, balance), suspension properties, tire properties, and road surface conditions as described above. Moreover, during actual traveling of the vehicle, changes in the load applied to the wheel occur more frequently due to changes in, such as, postures of the vehicle. Known indoor cornering test devices have a limitation in accuracy in reproducing various conditions the vehicle may encounter during actual traveling on the road surface (e.g., condition of load applied to the tire, tire rotating condition), thus preventing accurate measurement of the cornering forces generating on a contact surface of a specific tire.

On the other hand, as a method for evaluating cornering forces generating on a tire actually mounted to a vehicle, JP 2004-512207 A describes a system for estimating forces on a tire. The system described in JP 2004-512207 A uses a sensor to measure a torsional deformation of the side wall of the tire. Based on the measured torsional deformation, cornering forces that may generate on the tire are estimated. Also, JP 8-198131 A describes a vehicle state estimating apparatus in which a tire model corresponding to a vehicle movement state during traveling is established, and based on the tire model, a traveling state of the vehicle is estimated. According to the description of JP 8-198131 A, by using the vehicle state estimating apparatus described in JP 8-198131 A, the vehicle traveling state can be estimated accurately and constantly during the traveling.

However, for the system described in JP 2004-512207 A, it is necessary to obtain in advance a relationship between tire deformation and forces generating at the tire deformation. Obtaining the relationship between tire deformation and forces generating at the tire deformation requires a great deal of work. And moreover, if the relationship between tire deformation and forces generating at the tire deformation is used alone, it is impossible to accurately estimate the lateral forces generated on the contact surface under various conditions associated with the vehicle during actual traveling on the road (load condition applied to the tire, tire rotation state).

For the apparatus described in JP 8-198131 A, in order to estimate the actual traveling state of the wheel, it is necessary to establish a tire model as detail as possible. Therefore, prior to estimating the vehicle traveling state, there are various computing routines need to be executed, such as a characteristic curve identification routine for identifying a characteristic curve on vehicle load, and a tire model establish routine for establishing tire models. In these routines, a huge amount of data need to be acquired and subjected to computing processing, and evaluation also requires a significant amount of time and cost.

In addition, if evaluating a wheel cornering stability (a safety margin to reach slip state) under a traveling condition that has possibility of tire slipping, it is necessary to estimate the vehicle behavior in a time period as short as possible. However, the vehicle condition estimating apparatus described in JP 8-198131 A, performs analysis and processing using a tire model, after computing a slip angle of the vehicle based on the results detected by sensors mounted on the vehicle, such as a steering angle sensor, an acceleration sensor, and a yaw rate sensor. Due to such time consuming complicated processes, it is impossible to perform the computing and analysis preceding to the vehicle's behavior. It is difficult for the vehicle condition estimating apparatus described in JP 8-198131 A to evaluate the vehicle cornering stability (a safely margin to reach slip state) when the vehicle is actually cornering.

SUMMARY OF THE INVENTION

In view of the foregoing, an object of the present invention is to provide a method and apparatus that allows evaluation of wheel cornering stability (safety margin to reach a slip state) under various traveling conditions, when the vehicle is actually cornering.

The present invention has been made in order to solve the problems described above and to provide a method of evaluating a cornering stability of a wheel that is mounted to a vehicle and has a tire assembled thereto, when the vehicle is cornering on a road surface, the method comprising:

a deriving step of deriving an cumulative value of lateral displacement of an outer circumference surface portion of the tire, the cumulative value representing a resultant of an accumulation of the lateral displacement from a contact leading edge to a contact trailing edge of the tire, when the vehicle is cornering, and the cumulative value of displacement being derived continually at every unit of time;

a first calculating step of repeatedly calculating, each time when the cumulative value of displacement is derived, a change amount in the cumulative value of displacement for the unit of time as a change ratio in tire deformation by using the cumulative value of displacement derived present time and the cumulative value of displacement derived last time,;

a second calculating step of calculating, each time when the change ratio is calculated, a rate of change ratio in tire deformation, the rate of change ratio being calculated using the change ratio in tire deformation previously calculated as a reference value and the change ratio calculated present time; and a determining step of determining, based on the rate of change ratio calculated in the second calculating step, a cornering stability of the wheel that represents a degree of a margin in which the wheel keeps no sliding and beyond which the wheel start sliding.

Preferably, the second calculating step uses the change ratio in tire deformation that is calculated first after the vehicle has started cornering, as the reference value to calculate the rate of change ratio.

Preferably, the determining step compares the rate of change ratio calculated in the second calculating step to a predetermined threshold and, if the rate of change ratio is lower than the threshold, determines that a degree of a risk that the wheel reaches a sliding state is high.

Preferably, the method further includes a data acquiring step of acquiring, when the vehicle is cornering, acceleration data in a tire radial direction at a predetermined portion of the tire, due to contact deformation of the outer circumference surface portion of the tire during rotation of the tire, and acceleration data in a tire width direction at a predetermined portion of the tire, due to lateral deformation of the outer circumference surface portion of the tire during cornering of the vehicle respectively, and, wherein the deriving step of deriving the cumulative value of the displacement includes:

obtaining, based on the acceleration in the tire radial direction, a timing at which the predetermined portion is made in contact with the road surface, and a timing at which the predetermined portion is made out of contact with the road surface;

subjecting the acceleration data in the tire width direction to time integration of second order to obtain time series data of the lateral displacement due to deformation in the tire lateral direction, at the predetermined portion of the tire;

and accumulating the time series data of displacement from the timing at which the predetermined portion is made in contact with the road surface to the timing at which the predetermined portion is made out of contact with the road surface, thereby deriving step of deriving the accumulative value of the displacement.

Preferably, the acceleration data in the tire radial direction and the acceleration data in the tire width direction are measurement data obtained by attaching an acceleration sensor to a tire inner circumference surface that faces a tire cavity region at a tread portion of the tire.

Preferably, the deriving step obtains two timings at which the acceleration data in the tire radial direction at the predetermined portion of the tire, due to contact deformation of the outer circumference surface portion of the tire crosses 0 and uses the obtained two timings as the timings at which the predetermined portion is made in contact with and out of contact with the road surface.

The present invention also provides An apparatus for evaluating a cornering stability of a wheel that is mounted to a vehicle and has a tire assembled thereto, when the vehicle is cornering on a road surface, the apparatus comprising:

a memory capable of storing digit information; a deriving unit that derives and stores in the memory, an cumulative value of lateral displacement of an outer circumference surface portion of the tire, the cumulative value representing a resultant of an accumulation of the lateral displacement from a contact leading edge to a contact trailing edge of the tire, when the vehicle is cornering, and the cumulative value of displacement being derived continually at every unit of time;

a first calculating section that receives the derived cumulative value of displacement each time when the cumulative value of displacement is derived, retrieves the cumulative value of displacement that is derived last time and stored in the memory, and uses the cumulative value of displacement that is derived present time and the cumulative value of displacement that is derived last time so as to repeatedly calculate a change amount in the cumulative value of displacement for a unit of time as a change ratio in tire deformation, a second calculating section that receives the change ratio in tire deformation, each time when the change ratio in tire deformation is derived, uses the change ratio calculated last time as a reference value, and repeatedly calculates a rate of change ratio in tire deformation calculated this time with respect to the reference value, and a determination unit that receives the rate of change ratio in tire deformation calculated in the second calculating section, and based on the rate of change ratio, determines a cornering stability of the wheel that represents a degree of a margin in which the wheel keeps no sliding and beyond which the wheel start sliding.

Preferably, the apparatus further includes detecting means for detecting that the vehicle has started cornering when the vehicle is traveling.

Preferably, the first calculating section stores as the reference value, the change ratio in tire deformation calculated first after the detecting means has detected that the vehicle has started cornering and the second calculating section retrieves, each time when the change ratio in tire deformation is calculated, the reference value from the memory so as to calculate the rate of change ratio.

Preferably, the determining section compares the rate of change ratio calculated in the second calculating section to a predetermined threshold, and if the rate of change ratio is lower than the threshold, determines that a risk that the wheel reach a sliding state is high.

As described thus far, the method and apparatus according to the present invention allow evaluation of wheel cornering stability (safety margin to reach slip state), when the vehicle is actually cornering under various traveling conditions. In the practice of the present invention, it is possible to evaluate the wheel cornering stability with consideration of various factors associated with the actual vehicle, such as vehicle structure properties (weight, balance), suspension properties, tire properties and road surface conditions. In addition, evaluation of the cornering stability is achieved in a short period of time, without calculating slip angles and cornering forces. Therefore, it is possible to inform the vehicle's driver of the wheel cornering stability (safety margin to reach slip state) on a real time basis, when the vehicle is traveling. Also, evaluation of cornering stability specific to tires can be achieved in a short period of time, without requiring any expensive equipment or workload.

BRIEF DESCRIPTION OF THE DRAWINGS

In the accompanying drawings:

FIG. 2 is a schematic view explaining a sensor unit and a data processing unit of the wheel cornering stability evaluating apparatus shown in FIG. 1;

FIG. 4A is a side view of the tire shown in FIG. 3, and FIG. 4B is a bottom view of the tire shown in FIG. 3, seen from the contact road surface side;

FIG. 5 is graphs showing relationship between slip angle SA and cornering force CF, obtained with a known indoor cornering test device;

DETAILED DESCRIPTION OF THE INVENTION

A wheel cornering stability evaluating method and a wheel cornering stability evaluating apparatus of the present invention will hereinafter be described in detail on the basis of a preferred embodiment shown in the accompanying drawings.

Figure 1:
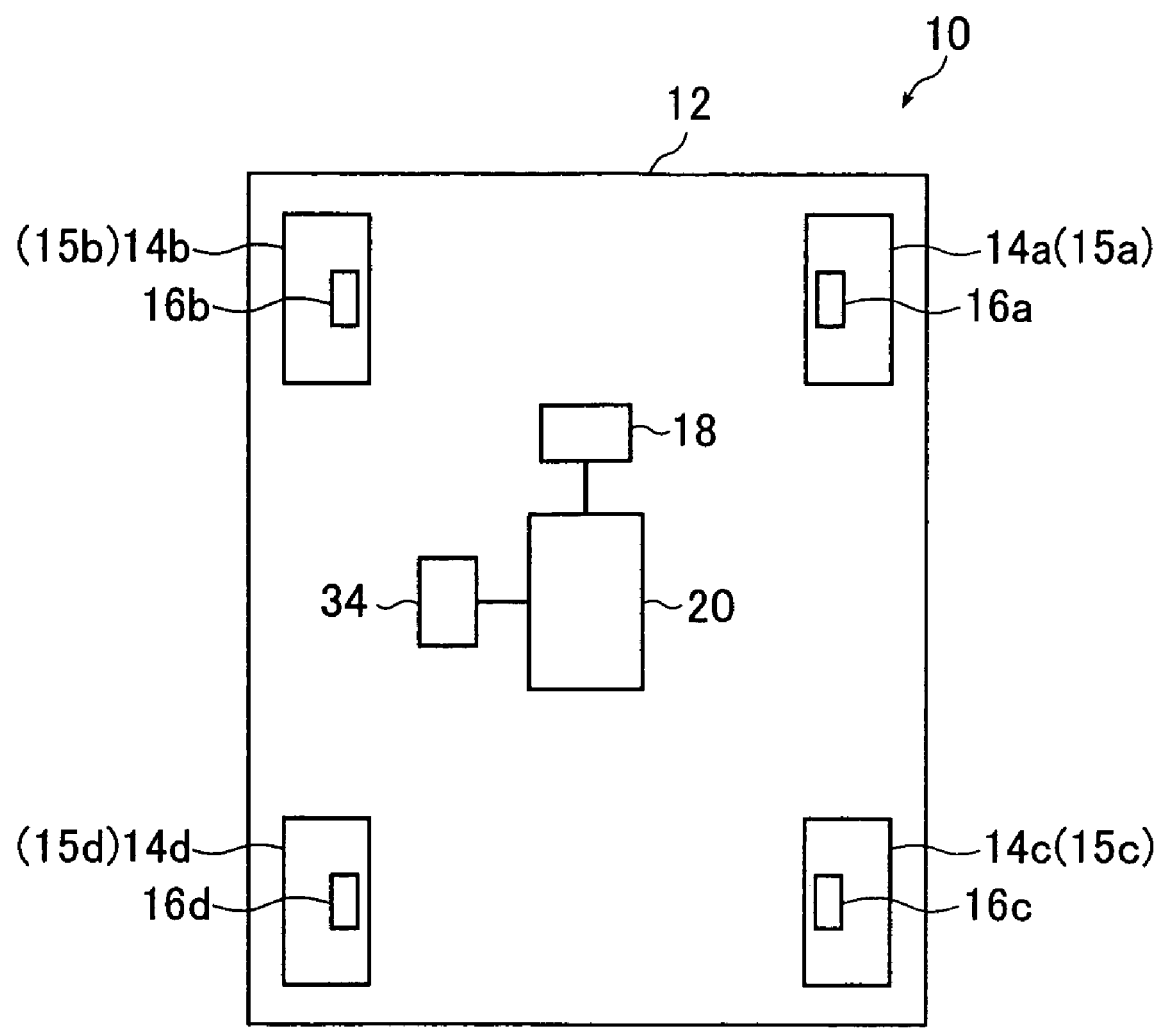
FIG. 1 is a schematic view explaining an example of a wheel cornering stability evaluating apparatus according to the present invention.

FIG. 1 shows a schematic view explaining a wheel cornering stability evaluating apparatus 10 (apparatus 10) as an example of a wheel cornering stability evaluating apparatus of the present invention. The apparatus 10 is provided on a vehicle 12 to which four wheels 14a-14d are mounted, and is used for determining the cornering stability of each of the wheels 14a-14d, on a real time basis, when the vehicle 12 is cornering. The four wheels 14a-14d have tires 15a-15d that are assembled to the wheels 14a-14d, respectively. All of the tires 15a-15d are the same in type (same in tire size, same in tire rim width, same in belt structure, or same in tire pressure level ) are mounted respectively. The apparatus 10 includes sensor units 16a-16d, a cornering start detection means 18, a data processing unit 20, and a display 40.

Each of the sensor units 16a-16d is provided on each of the four wheels 14a-14d, acquires acceleration information of a predetermined portion of the tire 15, and continually transmits the acquired acceleration information in a form of radio signals. The acceleration information occurs when each of the tires 15a-15d receives an external force from the road surface, when the vehicle 12 is traveling on the road surface. The cornering start detection means 18 detects that the vehicle 12 has started cornering and transmits the detection result indicating the start of cornering to the data processing unit 20. The cornering start detection means 18 may be configured by a rotation angle sensor fixed to, for example, a steering rod. In such case, for example, the rotation angle sensor measures the rotation angle of the steering rod, derives the steering angle of the wheels 14a-14d provided on the vehicle 12, based on the measurement result, and detects that the vehicle 12 has started cornering, based on the derived steering angle. For example, if the steering angle is equal or smaller than a predetermined reference angle, it may be determined that cornering has started. Alternatively, the cornering start detection means 18 may have a rotation angle speed sensor fixed to a steering rod, for example. In such case, it may be determined that the cornering has started, if the rotation angle speed is equal or larger than a predetermined angle speed. The cornering start detection means 18 may have a known GPS (Global Positioning System) and a database that stores data of traveling route for the vehicle 12. In the database, detailed information, such as corner portions (portions having a corner radius equal or larger than a predetermined value) on the travel route for the vehicle 12 is stored. For example, information of current position, and information of traveling direction of the vehicle 12 may be acquired by the GPS, and according to the information, the vehicle 12 may detects a timing when the vehicle 12 enters a corner portion as the timing when cornering has started. The results detected by the cornering start detection means 18 is transmitted to the data processing unit 20.

The data processing unit 20, upon receiving the measurement data from the cornering start detection means 18, and upon detecting that the vehicle 12 has started cornering, starts receiving of acceleration information transmitted from the sensor units 16a-16d to process the acceleration information, so that the cornering stability of each wheel is determined on a real time basis, while the vehicle 12 is cornering. The display 40 displays process results, determination results and other information from the data processing unit 20. While in the example shown in FIG. 1, the data processing unit 20 is arranged on the vehicle 12, the data processing unit 20 may be configured as portable, and is not limited to arrangement on the vehicle 12. The sensor units, data processing unit and display will be described below in detail.

FIG. 2 is a schematic view illustrating the sensor unit 16 (representative of the sensor units 16a-16d), and the data processing unit 20 of the apparatus 10 shown in FIG. 1. All of the wheels 14a-14d are the same in configuration, and all of the sensor units 16a-16d are the same in configuration. The sensor unit 16 includes an acceleration sensor 2 and a transmitter 17.

Figure 3A:
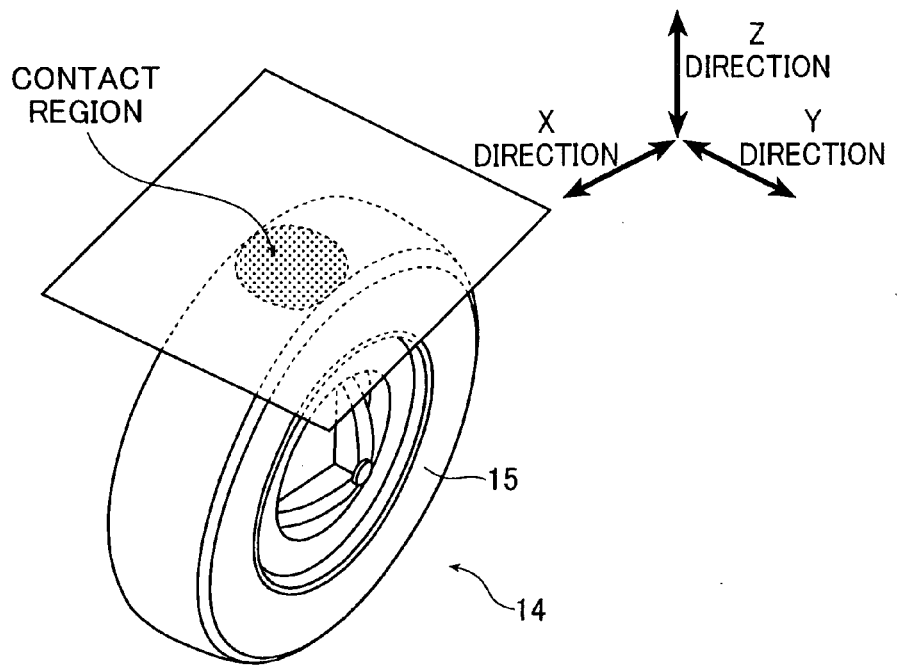
FIG. 3A is a perspective view of a tire of a wheel provided with the sensor unit shown in FIG. 2, seen from a contact surface side.
Figure 3B:
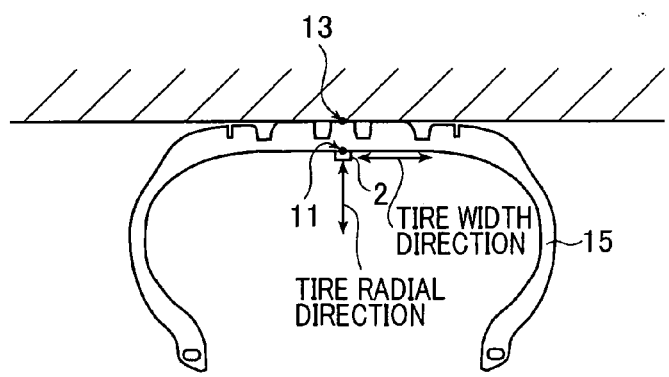
FIG. 3B is an enlarged sectional view of the tire.

FIGS. 3A and 3B are drawings illustrating the mounting position of the acceleration sensor 2 in the tire 15 (representative of the tires 15a-15d) of the wheel 14, and acceleration data detected by the acceleration sensor 2. FIG. 3A is a perspective view of the wheel 14 seen from the contact surface side, illustrating a state when the tire 15 is observed through contact road surface, assuming that the contact road surface is a transparent plate. FIG. 3B is an enlarged sectional view of the tire 15, when cutting the tire 15 with a meridian plane (a plane perpendicular to the tire equatorial plane) including the acceleration sensor 2. FIGS. 3A and 3B are schematic views each showing a state in which the vehicle 12 is traveling straight.

As shown in FIG. 3B, the acceleration sensor 2 is arranged in an inner surface position 11 of a tread portion of the tire 15. The acceleration sensor 2 is capable of measuring acceleration in the three axis directions perpendicular to each other, with respect to the tire inner surface position 11. In this embodiment, the acceleration sensor 2 measures acceleration in the tire width direction(tire lateral direction), acceleration in the tire radial direction, and acceleration in the tire circumferential direction along the shape of the tire outer circumference, at the inner surface position 11 of the tire 15, as shown in FIG. 3B. The inner surface position 11 of the tire 15 and the outer surface position 13 of the tire 15 corresponding to the inner surface position 11 are so close to each other that it may be considered that the acceleration at the inner surface position 11 corresponds to the acceleration at the outer surface position 13.

The acceleration sensor 2 is exemplified by a semiconductor acceleration sensor, for example, disclosed in Japanese Patent Application No. 2003-134727 (JP 2004-340616 A) filed by the present applicant. The semiconductor acceleration sensor includes, specifically, an Si wafer having a diaphragm formed inside the outer peripheral frame portion of the Si wafer, and a pedestal for fixing the outer peripheral frame portion of the Si wafer. A weight is provided at the center part of one surface of the diaphragm, and a plurality of piezoresistors are formed on the diaphragm. When acceleration is applied to this semiconductor acceleration sensor, the diaphragm is deformed to cause the resistance values of the piezoresistors to change. In order to detect such changes as acceleration information, a bridge circuit is formed.

By fixing the acceleration sensor 2 to the tire inner surface position 11 so as to allow measurement of acceleration in the tire radial direction, acceleration in the tire width direction, and acceleration in the tire circumferential direction, respectively. Accordingly, the acceleration applied to the tread portion during tire rotation can be measured.

To be more specific, the acceleration sensor 2 is fixed to the tire inner surface position 11 to make it possible to measure acceleration in the tire radial direction, acceleration in the tire width direction, and acceleration in the tire circumferential direction. In this context, the tire radial direction means, a direction along a perpendicular line dropped from the tire inner surface position 11 to the rotation center axis of the tire 15, when the cavity region inside the tire 15 is filled with air so that the tire 15 achieves a predetermined air pressure, and the tire 15 is kept out of contact. The tire width direction means a direction that is perpendicular to the tire radial direction, and parallel to a plane (the meridian plane of the tire 15) including the rotation center axis of the tire 15, which passes the tire inner surface position 11. The tire circumferential direction means, a direction perpendicular to either of the tire radial direction and tire width direction. Other sensors that may be used as the acceleration sensor 2, include acceleration pickups that use piezoelectric elements and distortion gage type acceleration pickups that incorporate distortion gages.

The acceleration detected by the acceleration sensor 2 is transmitted from the transmitter 17 of each transmitting unit to the data processing unit 20. Alternatively, instead of providing the transmitter 17, the acceleration sensor 2 may have transmitting capability additionally so that the detected acceleration is transmitted from the acceleration sensor 2 to the data processing unit 20. The transmitter 17 provided in the wheel 14 has identification information (ID) which allows identification of each transmitter 17. The transmitter 17 transmits the ID along with the measurement data of the acceleration measured by each corresponding acceleration sensor.

The data processing unit 20 includes a CPU 23, a memory 27, a receiver 3, an amplifier 4, processing means 21, and determining means 30. The acceleration information transmitted by the transmitter 17 is received by the receiver 3 of the data processing unit 20, amplified by the amplifier 4, and transmitted to the processing means 21. The data processing unit 20 is a computer in which the CPU 23 executes programs stored in the memory 27 to allow each section included the processing means 21 and the determining means 30 to function. Each section included in the processing means 21 and the determining means 30 may also be configured by a dedicated circuit.

The processing means 21 includes a data acquiring section 22, a signal processing section 24, a timing deriving section 26, and an trajectory deriving section 28. The data acquiring section 22 acquires, as input data, the measurement data of acceleration in the tire radial direction, acceleration data in the tire width direction, and acceleration data in the tire circumferential direction, which have been amplified by the amplifier 4. The data supplied from the amplifier 4 is analog data. The data acquiring section 22 converts the acceleration data in the three directions into digital data by sampling at a predetermined frequency. The data acquiring section 22 uses the ID transmitted from each transmitter 17 as described above, to determine which one of the tires (which one of the wheels 14a-14d), the received measurement data of acceleration is associated with. Once each associated wheel is determined, processes in the signal processing section 24, the contact timing deriving section 26, the trajectory deriving section 28, and the determining means 30 (will be described later) are performed on an each wheel basis in parallel.

The signal processing section 24 employed as a unit for extracting time series data of acceleration due to the tire deformation from the digitized measurement data of acceleration in the three directions (tire radial direction, tire width direction, and tire circumferential direction). The signal processing section 24 carries out smoothing processing of measurement data of acceleration and calculates an approximation curve to the smoothed signals so as to obtain a background component 1. Then the background component 1 is removed from the measurement data of acceleration that has been subjected to smooth processing, so that the time series data of acceleration in the tire radial direction, in the tire width direction, and in the tire circumferential direction, due to on the tire deformation (deformation acceleration time series data) is obtained. The extracted deformation acceleration time series data is transmitted to the contact timing deriving section 26, and the trajectory deriving section 28, respectively. Specific processing in the signal processing section 24 will be described later.

The contact timing deriving section 26 derives, particularly due to the deformation acceleration time series data in the tire radial direction, a timing at which the outer surface position 13 of the tire 15, which is rotating on a traveling road surface, is made in contact with the traveling road surface, and a timing at which the outer surface position 13 is made out of contact with the traveling road surface. The trajectory deriving section 28 derives a trajectory of the outer surface position 13 of the tire 15 which is rotating on the traveling road surface, in XYZ-space shown in FIG. 3A, due to the deformation acceleration time series data in the three directions (tire radial direction, tire width direction, and tire circumferential direction). The X axis (X direction) in FIG. 3A is an axis (direction) parallel with the ground (contact surface of the tire 15), and parallel with the moving direction of the tire 15. The Y axis (Y direction) in FIG. 3A is an axis (direction) parallel with the ground, and along with the rotation center axis of the tire 15. The Z axis (Z direction) in FIG. 3A is an axis (direction) perpendicular to the ground.

The contact timing to be derived in the contact timing deriving section 26, and the trajectory of the outer surface position 13 to be derived in the trajectory deriving section 28, will now be explained. FIGS. 4A and 4B are drawings showing the deformation state of the tire 15 when the vehicle 12 is traveling. FIG. 4A is a side view of the tire 15, showing and enlarging the vicinity of the contact portion between the tire 15 and the road surface. FIG. 4B is a bottom view of the tire 15, seen from the contact road surface side, showing only the contact region between the outer circumferential surface of the tire 15 and the road surface.

As shown in FIG. 4A, the tire 15 of the wheel 14 is pushed against the contact road surface by the own weight of the vehicle 12 and the wheel 14. If the tire 15 is seen from the side surface, the outer surface of the tire 15 is in a linear shape, and other portions are in an arc shape. The outer surface position 13 corresponding to the acceleration sensor 2 fixed in the tire 15 is made in contact with the traveling road surface at a leading edge of the contact region, is moved along the contact road surface and then is made out of contact with the road surface at a trailing edge of the contact region. The contact timing deriving section 26 derives the in-contact and out-of-contact timings of the outer surface position 13, based particularly on the deformation acceleration time series data in the tire radial direction.

When the vehicle 12 is cornering, the equatorial plane of the tire 15 has an angle (slip angle SA) with respect to the traveling direction of the vehicle 12. That is, the wheel 14 slidingly rotates, and the equatorial plane of the tire 15 maintains the slip angle SA with respect to the traveling direction of the vehicle 12. If the contact portion is seen from a coordinate system fixed to the tire 15 while the tire 15 is cornering, the road surface moves backward. The tread surface of the tire is made in contact with the road surface at the leading edge of the contact portion, and is moved in the side back direction (downward direction in FIG. 4B) with the passage of time, while maintaining contact (adhesion) with the road surface. In this state, the tread surface of the tire 15 is pushed by the road surface in a lateral direction, the tread portion is subject to shear deformation, thus causing a cornering force substantially perpendicular to the vehicle traveling direction. The amount of shear deformation increases as the tread portion moves backward. At a point where the deformation force and the friction force between the tread and the road surface are equivalent, sliding starts. In the region after the equivalent point, the tread causes sliding, and a sliding friction force is generated. Then the tread restores to its original state at the trailing edge of the contact region. The amount of deformation in the shape of the tread portion of the tire significantly affects the amount of the cornering force. In the tire which is rotating as described above, the outer surface position 13 (inner surface position 11 and acceleration sensor 2) produces an trajectory indicated by a wide line in FIG. 4B, in the contact region.

The trajectory deriving section 28 carries out time integration on the deformation acceleration time series data to calculate each displacement due to tire deformation (deformation displacement) at the outer surface position 13 corresponding to the fixing position of the acceleration sensor 2 (inner surface position 11). In this manner, the trajectory of the outer surface position 13 of the tire 15 which is rotating on a traveling road surface, in XYZ-space is derived in detail. Processes in the contact timing deriving section 26, and the trajectory deriving section 28 will be described later in detail.

The contact timing information derived in the contact timing deriving section 26 and the rotation trajectory information derived in the trajectory deriving section 28 are transmitted to the determining means 30. The determining means 30 includes a deformation area deriving section 32, a first calculating section (change ratio calculating section) 34, a second calculating section (ratio calculating section) 36, and a determining section 38.

The deformation area deriving section 32 calculates, from the in-contact and out-of-contact timings, and the trajectory of the outer surface position 13 in the contact region, information of deformation area of the outer circumferential surface of the tire 15 when the vehicle 12 is cornering. The information of deformation area of the outer circumferential surface of the tire 15 means information representing the amount of the deformation on the outer circumferential surface of the tire 15, from the contact leading edge to the contact trailing edge. Specifically, the deformation displacement time series data in the tire width direction derived by the trajectory deriving section 28 is integrated, from the in-contact timing to the out-of-contact timing of the outer surface position 13, which are derived in the contact timing deriving section 26. In other words, the deformation area deriving section 32 calculates the cumulative values of the deformation displacement described above, corresponding to the hatched portion (deformation area) shown in FIG. 4B. It can be assumed that such deformation area (cumulative value of displacement) represents the size of the deformation of the tire 15 in the contact region of the tire 15.

As described thus far, the size of deformation of the tire 15 in the contact region of the tire 15 significantly affects the amount of cornering force. Accordingly the deformation area described above may be a parameter that represents the amount of cornering force. In the deformation area deriving section 32, the deformation area is repeatedly derived at a predetermined unit of time. The derived deformation area data is stored in the memory 27 as well as is transmitted to the first calculating section 34.

The first calculating section 34 receives the deformation area data transmitted from the deformation area deriving section 32, and calculates a change ratio in the deformation area, by using the deformation area received this time(present time) and the deformation area calculated last time and stored in the memory 27. Specifically, the first calculating section (change ratio calculating section) 34, upon receiving the current deformation area from the deformation area deriving section 32, retrieves the deformation area recorded last time (the deformation area derived one unit of time before) from the memory 27. The current deformation area is then divided by the last deformation area to calculate the change ratio in the deformation area.

The change ratio in the deformation area calculated first after the vehicle 12 has started cornering is recorded in the memory 27 as a reference value. The change ratio calculated second and thereafter is transmitted to the second calculating section 36. Subsequently, the first calculating section 34 calculates the change ratio in the deformation area and transmits it to the second calculating section 36 each time when receiving deformation area data from the deformation area deriving section 32 (with repetition at every unit of time).

The second calculating section 36 receives the change ratio (change ratio in deformation area) transmitted from the first calculating section (change ratio calculating section) 34, and calculate a rate of change ratio using the received change ratio and the reference value. Specifically, the second calculating section 36, when receiving the current change ratio from the first calculating section 34, retrieves the reference value (change ratio calculated first time) recorded in the memory 27, and divides the current change ratio by the reference value to calculate the rate of change ratio. The rate of change ratio calculated in the second calculating section 36 is transmitted to the determining section 38. The second calculating section 36 calculates the rate of change ratio and transmits it to the determining section 38 each time when receiving the change ratio data from the first calculating section 34 (with repetition at every unit of time).

Figure 6:
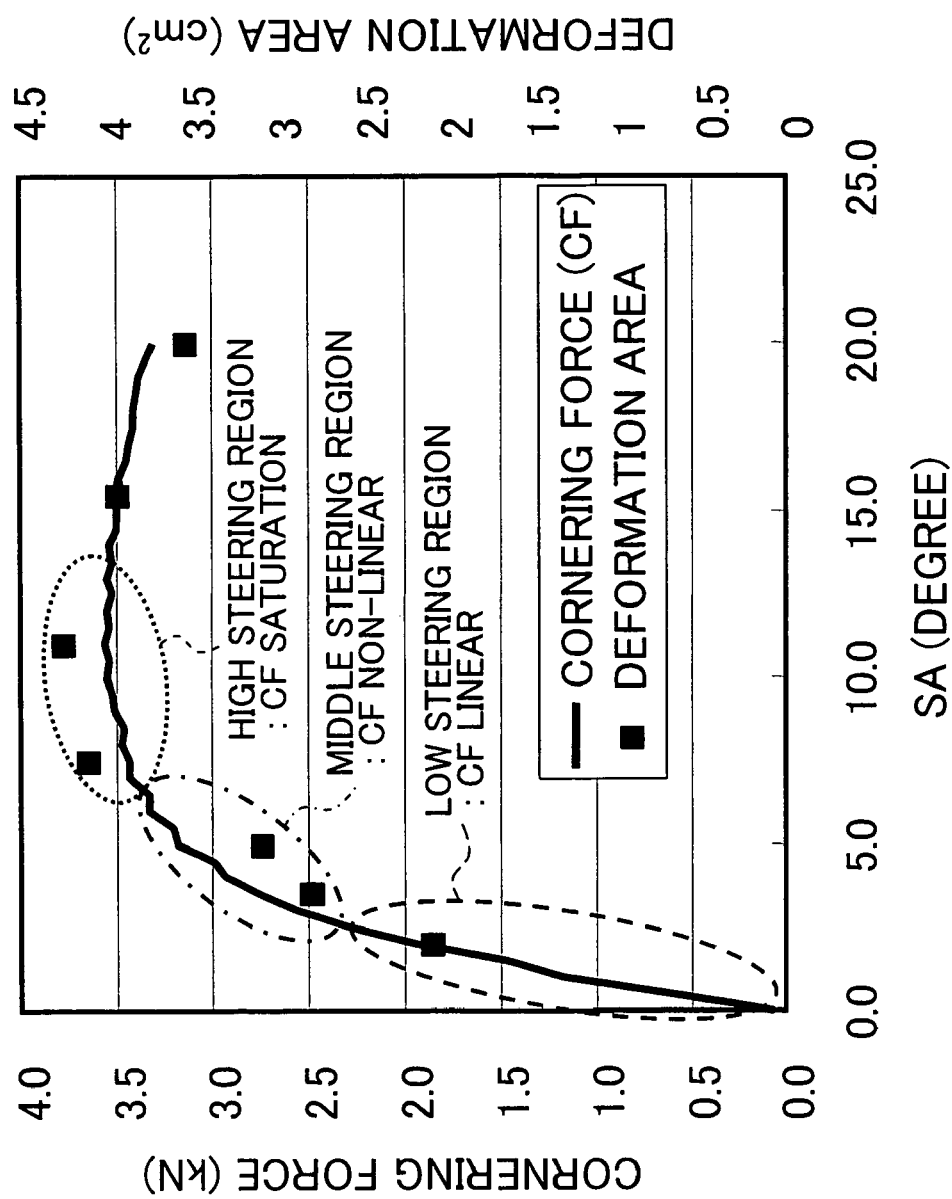
FIG. 6 is a graph showing condition A among a plurality of conditions shown in FIG. 5.

The change ratio and the rate of change ratio in this embodiment will now be described. FIG. 5 is graphs showing relationship between slip angle SA and cornering force CF, obtained with a known indoor cornering test device. The plurality of graphs shown in FIG. 5, illustrate the test results of one same tire which is put under a plurality of measurement conditions by changing the contact load (Load) and the camber angle (CA). FIG. 6 is a graph showing a case of condition A extracted from the plurality of conditions shown in FIG. 5

As apparent from FIG. 5, even if the traveling condition, such as load condition or camber angle, is changed, the behavior in which the cornering force (CF) changes with the increase in SA is the same. That is, in a region having a slip angle of relatively small (low steering region), the cornering force CF increases with the increase in the slip angle SA, and a substantially proportional relationship exists between the cornering force CF and the slip angle SA. If the slip angle is increased to a certain extent (middle steering region), the substantially proportional relationship between cornering force CF and slip angle (SA) is collapsed. If the slip angle is increased to a great extent (high steering region), the amount of the cornering force CF is saturated (to be more specific, moderately reduces with the increase in SA).

In general, cornering of a vehicle is achieved by gradually increasing a steering angle of the wheel through operation of a steering apparatus such as a steering wheel by the driver. In such cornering, the slip angle of the wheel increases with the passage of time. If steering is done over a certain period of time, the slip angle of the wheel increases from the low steering region, to the middle steering region, and then to the high steering region. So that, graphs similar to the graphs shown in FIG. 5 can be used to illustrate the time series change in the amount of the cornering forces applied to the wheel during cornering, by replacing the slip angle SA used as the horizontal axis in FIG. 5 with a certain time axis.

FIG. 6 also shows the relationship between deformation area calculated based on the measurement data (time series acceleration data) obtained by an accelerometer fixed in the tire and slip angle SA. The change in the cornering force CF with respect to the change in the slip angle SA, is quite consistent with the change in the deformation area with respect to the change in the slip angle SA. The method of calculating the deformation area shown in FIG. 6 will be described later in detail. As described above, it is assumed that the size of the deformation area is a parameter that represents the amount of cornering force. For cornering of common vehicles in general in which the slip angle SA increases on a time series basis, graphs similar to the graphs shown in FIG. 5 can be used to illustrate the time series change in the deformation area, by replacing the slip angle SA used as the horizontal axis in FIG. 5 with a certain time axis, and replacing the cornering force used as the vertical axis in FIG. 5 with the deformation area.

That is, when a vehicle is cornering, deformation increases with the passage of time, in the initial state (low steering region) of cornering, and a substantially proportional relationship exists between the deformation area and the time. If a certain period of time is elapsed (middle steering region), the substantially proportional relationship between deformation area and elapsed time is collapsed. If a certain period of time is further elapsed (high steering region), the size of the deformation area is saturated (to be more specific, moderately reduces with the passage of time). The relationship between deformation area and time described above is valid with accuracy for cornering in which the time and the slip angle of the wheel are in a proportional relationship, for example, with the steering angle being fixed, the traveling speed is increased at a constant increase rate (increase amount for unit of time is constant), or with the traveling speed being fixed, the steering angle is increased at a constant increase rate (increase amount for unit of time is constant).

Figure 7:
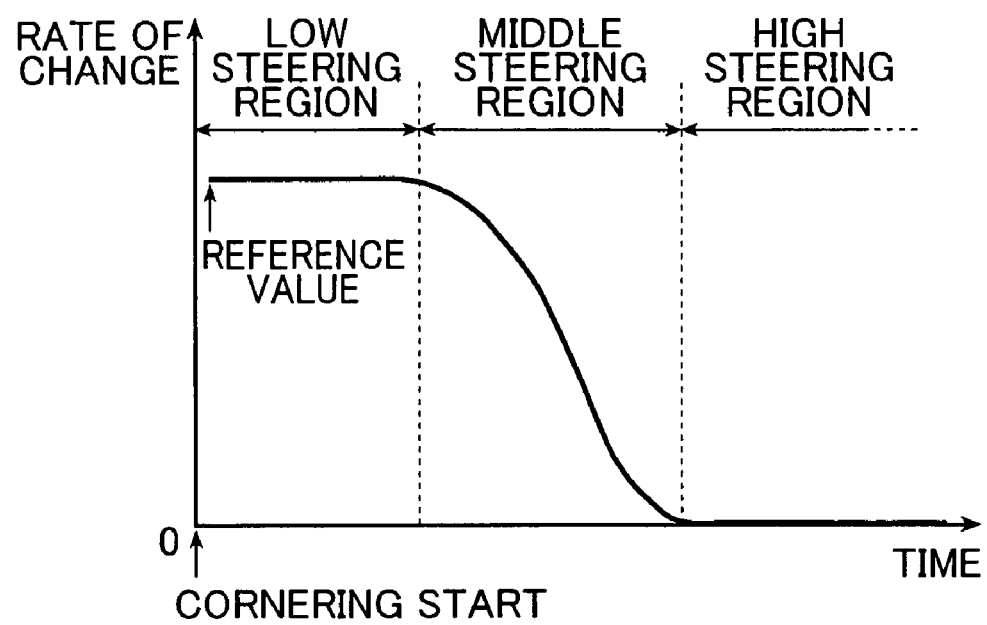
FIG. 7 is a graph outlining a time series change in the change ratio when the vehicle is cornering.

In the low steering region in which the deformation area and time are in a substantially proportional relationship, the change ratio in the deformation area (deformation amount per unit of time) is relatively large, and substantially constant, even with the passage of time. In the middle steering region, the change ratio in the deformation area gradually reduces with the passage of time. In the high steering region, the change ratio is substantially constant, even with the passage of time. Such change in the change ratio can easily be determined from the graphs shown in FIGS. 5 and 6. FIG. 7 is a graph outlining a time series change in the change ratio when the vehicle is cornering. As shown in FIG. 7, the change ratio transits with the passage of time from constant, to decrease, and then to constant (to be more specific, a value almost 0). The change ratio calculating section 34 calculates the change ratio at a predetermined time interval during cornering of the vehicle 12. And the memory 27 stores, as the reference value, the change ratio first calculated after the start of cornering.

Figure 8:
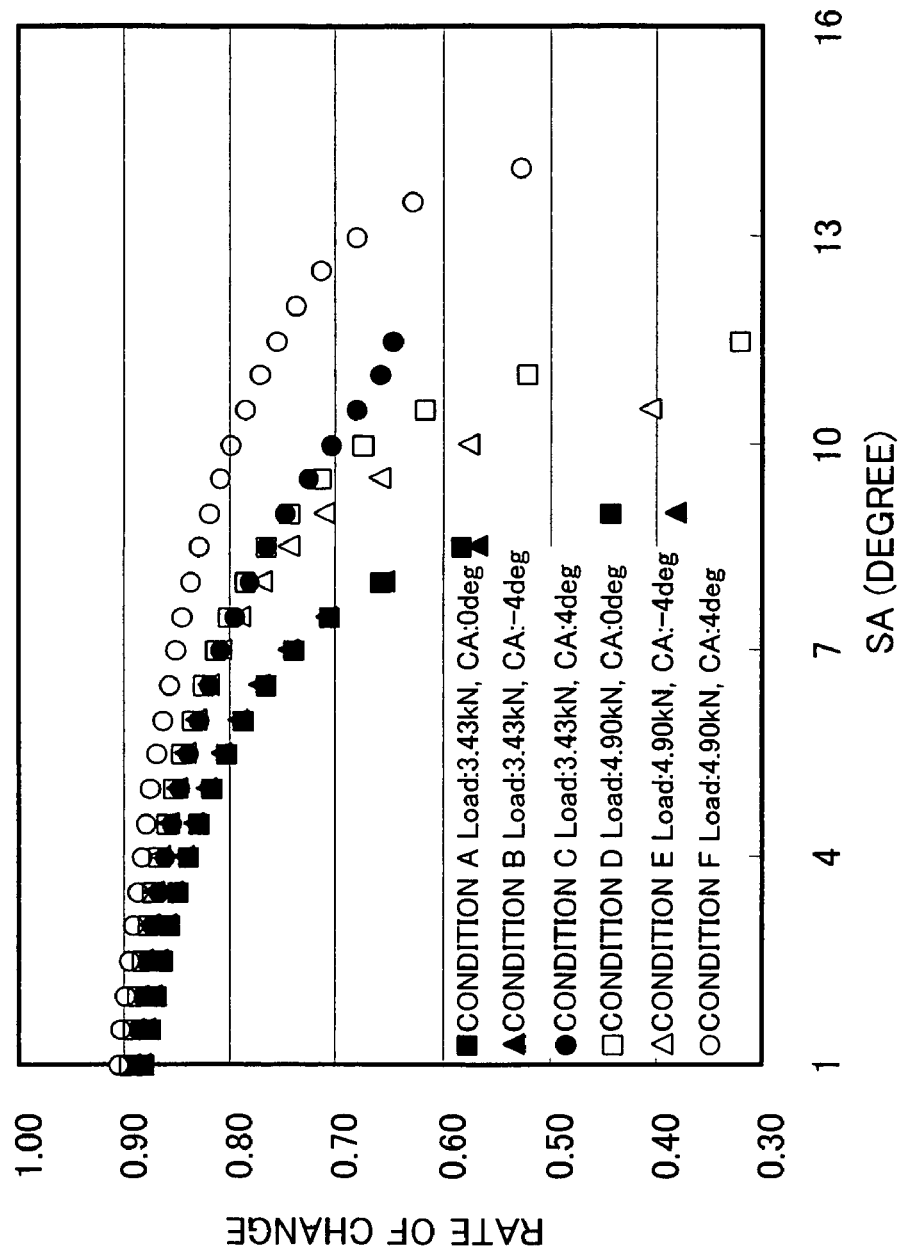
FIG. 8 is graphs showing relationship between slip angle and change ratio, calculated for each of the graphs shown in FIG. 5.
Figure 9:
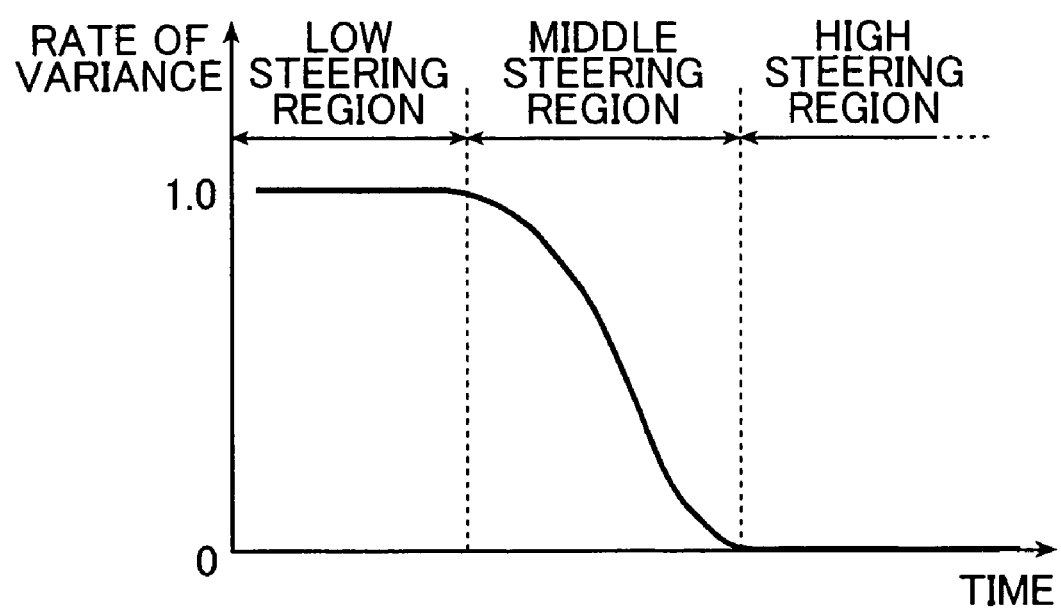
FIG. 9 is a graph outlining a time series change in the rate of change ratio.

FIG. 8 is graphs showing relationship between slip angle and change ratio, calculated for each of the plurality of graphs shown in FIG. 5. The graphs shown in FIG. 8 are obtained by calculating the change ratio in the cornering force CF by increasing the slip angle SA by every 0.5 degree, for each of the graphs shown in FIG.5. As described above, during cornering, with the passage of cornering time, the slip angle increases. In general cornering of common vehicles, the horizontal axis in FIG.8 is considered as the cornering time. As shown in FIG. 8, the values of change ratio are substantially constant (approximately 0.90) in the low steering region, under any of the cornering conditions. The values are gradually reduced over the region from the low steering region to the middle steering region. As shown in FIG. 9 also, the behaviors of the change in the change ratio are the same, even if the condition is changed, or the tire type is changed.

The second calculating section 36 calculates, each time when the change ratio is calculated, the rate of change ratio of the calculated change ratio with respect to the above described reference value. FIG. 9 is a graph outlining a time series change in the rate of change ratio during cornering of the vehicle. The rate of change ratio which is calculated each time when the change ratio is calculated, that is, at every unit of time, is represented by a graph obtained by normalizing the graph of the change ratio shown in FIG. 7 by using the reference value. As can be determined from the behaviors of the change in the change ratio shown in FIGS. 7 and 8, even if the tires or cornering conditions are different, the rate of change ratio is constant and is very close to 1.0 in the low steering region and then is reduced over the region from the middle steering region to the high steering region, as shown in FIG. 9. The second calculating section 36 calculates the rate of change ratio on a time series basis, and then sequentially transmits it to the determining section 38.

The determining section 38 determines whether or not the value of rate of change ratio transmitted by the second calculating section 36 is lower than the predetermined threshold value. If the rate of change ratio is lower than the predetermined threshold value, the determining section 38 determines that the cornering stability is decreased (i.e., the cornering stability of the vehicle is decreased, causing higher possibility that the vehicle enters a slip state). And in order to inform the driver of the determination result (decreased cornering stability), a warning screen is displayed on the display 40. The display 40 is used for not only displaying the above warning screen, but also displaying waveforms of the acquired acceleration data, calculated various parameters, and other various data and calculation results used in the data processing unit 20, as necessary.

Specific processes performed in the determining section 38 will now be explained. During cornering of vehicles, an area where sliding of the wheel starts to become noticeable on the way from the middle steering region to the high steering region. With the relationship between slip angle of the wheel and the cornering force being in the middle steering region, if the slip angle is further increased, the relationship enters in the high steering region. Then, in a short period of time, the vehicle enters a slip state. In contrast, with the relationship between slip angle of the wheel and cornering force being in the middle steering region, if the slip angle is decreased, the relationship enters the low steering region, and sliding of the vehicle is decreased, resulting in a stable and safe cornering state. If the driver can notice that the relationship between slip angle of the wheel and cornering force has entered the area of shifting from the middle steering region to the high steering region, it is possible to prevent the vehicle from entering a slip state. For example, by driving the vehicle so as not to further increase the slip angle, or to decrease the slip angle, the vehicle is prevented from entering a slip state. For example, by reducing the traveling speed of the vehicle, or by reducing the steering angle of the wheel, the slip angle can be reduced. In evaluating the cornering stability of a wheel, it is important to have a capability of noticing whether or not the relationship between slip angle of wheel and cornering force is on the way from the middle steering region to the high steering region.

As shown in FIG. 9, in the low steering region, the value of the rate of change ratio is constant and very close to 1.0. The value of the rate of change ratio decreases in the area of shifting from the low steering region to the middle steering region, and then further decreases in the area of shifting from the middle steering region to the high steering region. Determining whether or not the rate of change ratio is lower the predetermined value in the determining section 38 allows determination of whether or not the vehicle during cornering is in the area of shifting from the middle steering region to the high steering region.

Figure 10:
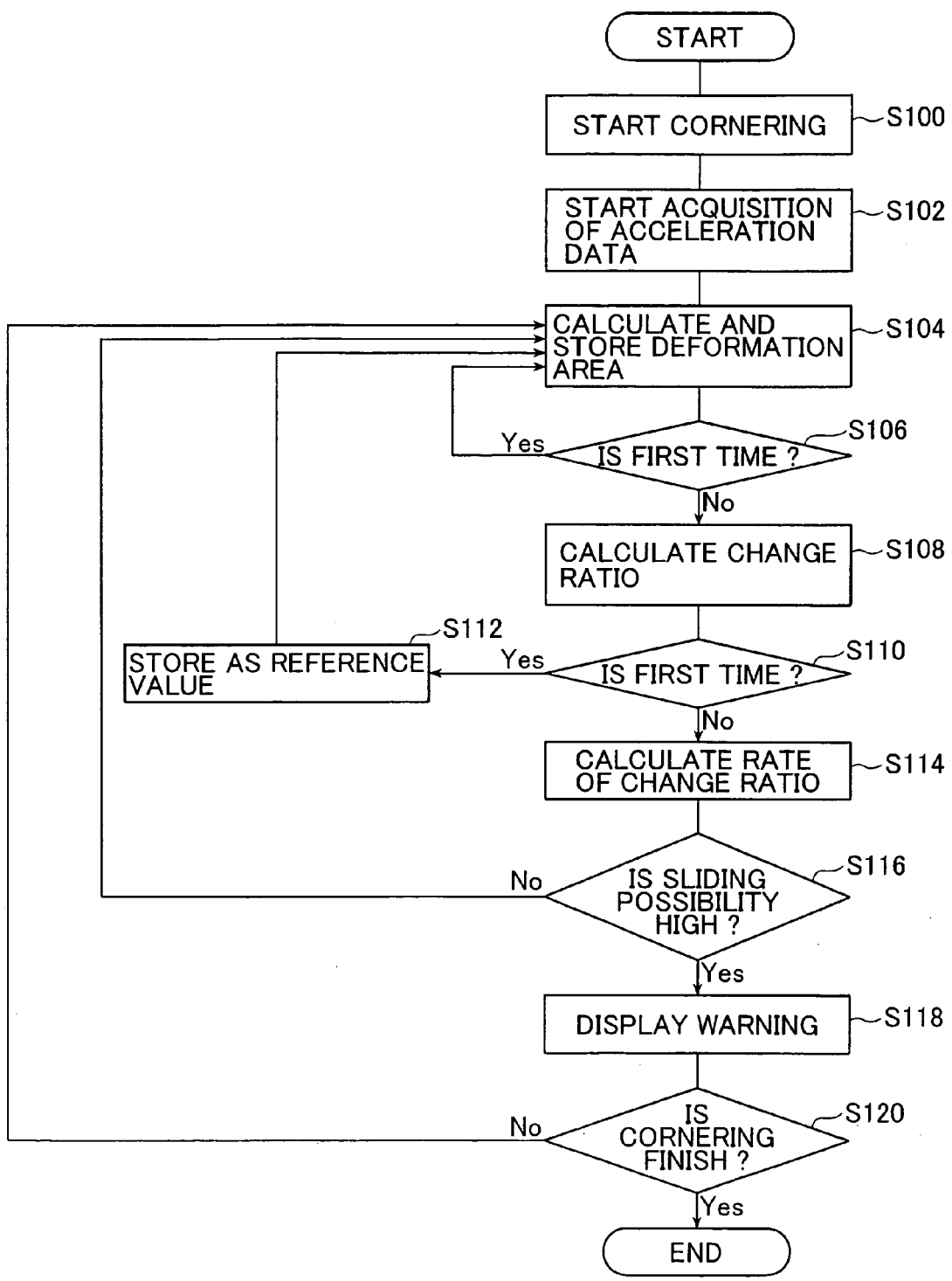
FIG. 10 is a flow chart showing an example of a wheel cornering stability evaluating method of the present invention.

FIG. 10 is a flow chart of a wheel cornering stability evaluating method of the present invention, implemented in the apparatus 10 described above. The wheel cornering stability evaluating method of the present invention implemented in the apparatus 10 will now be explained in the following description.

First, cornering of the vehicle 12 is started by steering the wheel 14, through a vehicle steering apparatus such as a steering which is operated by the driver of the vehicle 12 (step S100). Once cornering starts, the cornering start detection means 18 detects that the vehicle 12 has started cornering, and then starts acquisition of acceleration data in the three directions (tire radial direction, tire width direction, and tire circumferential direction) of the wheel 14 (step S102).

In step S102, the data processing unit 20 continually receives the acceleration information transmitted from the sensor units 16a-16d and processes the received acceleration information. Specifically, the data acquiring section 22 acquires, as input data, acceleration data in the three directions (tire radial direction, tire width direction, and tire circumferential direction) which has been amplified by the amplifier 4. The data supplied from the amplifier 4 is analog data. The data acquiring section 22 converts the acceleration data in the three directions (tire radial direction, tire width direction and tire circumferential direction) into digital data by sampling with a predetermined frequency. In such cases, the data acquiring section 22 determines, based on the ID transmitted form each transmitter 15, which wheel (which one of the wheels 14a-14d) the received measurement data of acceleration of a tire is associated with.

Figure 11:
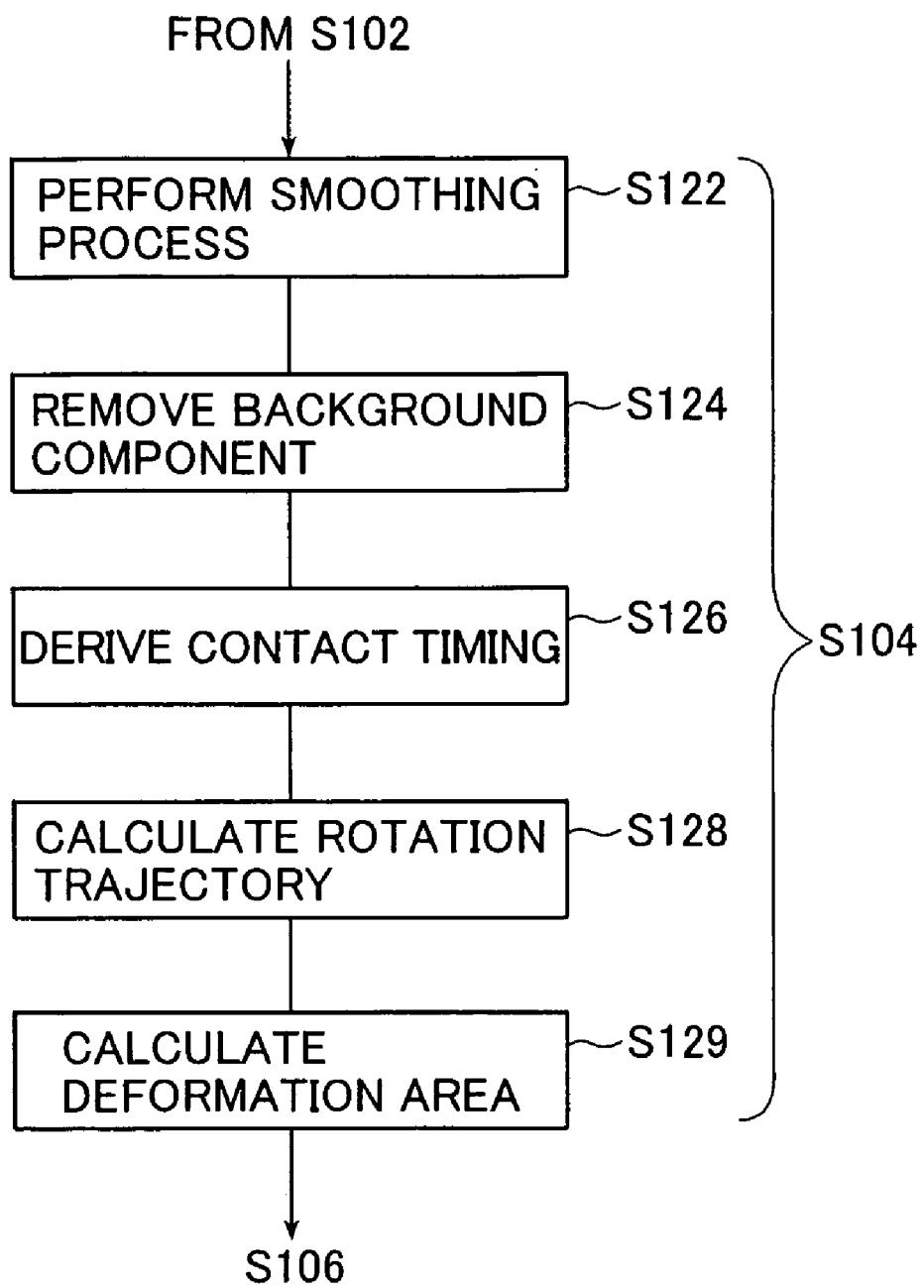
FIG. 11 is a flow chart showing a deformation area calculation process in detail.

Then, from the acceleration data in the three directions (tire radial direction, tire width direction, and tire circumferential direction), the deformation area on the surface of the tire 15 in the contact region is calculated (step S104). The calculation process of the deformation area in step S104 will now be explained in detail in the following description. FIG. 11 is a flow chart showing the detail of the calculation process in step S104 in the flow chart shown in FIG. 10.

FIGS. 12A, 12B, 12C, and 13 show examples of the results obtained in each process in the apparatus 10. Any of the results shown in FIGS. 12A, 12B, 12C, and 13 shows the process results of the acceleration data in the tire radial direction measured by the acceleration sensor 2. The acquired digital acceleration data is supplied to the signal processing section 24 and is subjected to smoothing process with a filter (step S122).

Figure 12A:
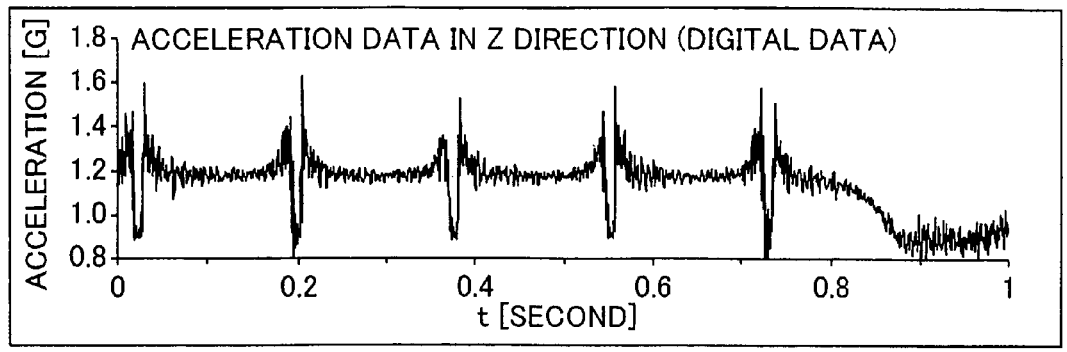
FIG. 12A is a graph showing digital acceleration data in the tire radial direction, acquired by a tire acceleration data acquiring section.
Figure 12B:
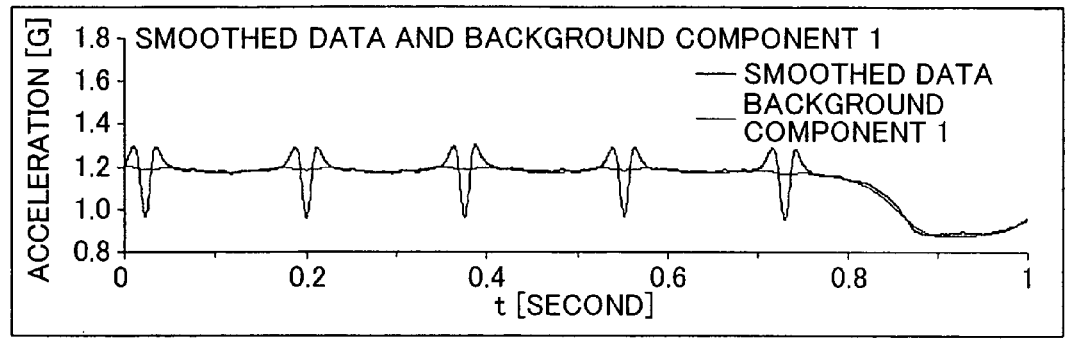
FIGS. 12B and 12C show the processing results of the digital acceleration data shown in FIG. 12A in the data processing unit.

FIG. 12A is an example of digital acceleration data in the tire radial direction, obtained by the tire acceleration data acquiring section 22. The measurement data supplied to the signal processing section 24, as it contains many noise components as shown in FIG. 12A, is then subjected to smoothing processing to provide smoothed data as shown in FIG. 12B. The filters that may be used include, for example, digital filters that assume a certain frequency as a cut-off frequency. The cut-off frequency changes depending on rotation speeds or noise components. For example, if the rotation speed is 60(km/h), the cut-off frequency is between 0.5 and 2 (kHz). Alternatively, instead of using the digital filters, moving average process, trend model process, and other suitable processes may be used as the smoothing processing.

Then, in the signal processing section 24, background component 1 of low frequency is removed (step S124) from the acceleration measurement data which has been subjected to smoothing process. For example, the background component 1 of the acceleration in the tire radial direction includes effects from acceleration components of the centrifugal force (centripetal force) due to rotation of the tire and acceleration components of the gravitational force. In FIG. 12B, the waveform of the background component 1 for the acceleration data in the radial direction is indicated. The background component is extracted by performing smoothing process further on the waveform obtained in step S104 that has been subjected to smoothing process. For example, digital filters that assume a certain frequency as a cut-off frequency may be used. For example, if the rotation speed is 60(km/h), the cut-off frequency is between 0.5 and 2 (kHz). Alternatively, instead of using the digital filters, moving average process, trend model process, and other suitable processes may be used as the smoothing processing. The background component is also extracted by calculating a first approximation curve by means of least squires method by providing a plurality of nodes in the waveform of the smoothed data, for example, at a predetermined time interval and using a predetermined function group, such as spline functions of third order. The nodes provide constraint conditions on the horizontal axis, that give local curvatures (jog) of the spline functions.

Figure 12C:
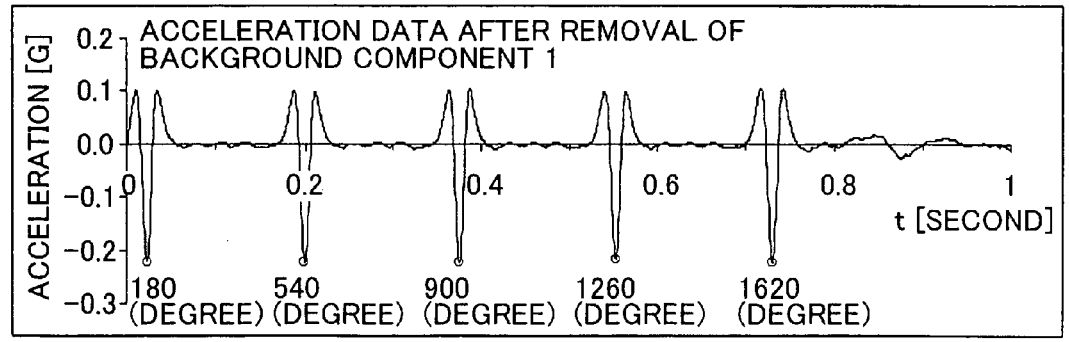

In the signal processing section 24, thus extracted background component 1 is subtracted from the measurement data of acceleration subjected to smoothing process in step S122, so that the acceleration components due to tire rotation and the acceleration components of the gravitational force are removed from the measurement data. FIG. 12C shows the time series data of acceleration after the removal of background component. In this manner, the acceleration components due to contact deformation of the tire tread portion (deformation acceleration time series data) are extracted. The smoothing processes (step S122) and the removal of background component (step S124) are performed on the acceleration data in the three directions (tire radial direction, tire width direction and tire circumferential direction).

In this case, the signal processing section 24 extracts, from the time series data of acceleration due to tire deformation thus obtained, timings when the above described rotation angle θ is 180 degree, 540 degree, 900 degree and so forth. In the signal processing section 24, the timings at which the acceleration due to tire deformation takes minimum values in the graph of the time series data of acceleration due to tire deformation, are extracted as the timing when the rotation angle θ is 180 degree, 540 degree, 900 degree and so forth. In other words, as shown in FIG. 2, the timings of the minimum values are extracted as the timings when the acceleration sensor 2 fixed on the inner circumference surface in the tire cavity region comes to the center position of (nearest to) the contact surface of the tire. This is because, in the contact region of the time, the positions on the outer circumference surface in a direction perpendicular to the road surface are limited by the road surface.

In the contact region, the road surface deforms the tire outer circumference surface which originally has a curvature into a plane-like shape, thus causing the tire to deform in a tire thickness direction (direction perpendicular to the road surface). Therefore, the positions on the inner circumference surface of the tire cavity region displace in the tire thickness direction by a certain amount. Deformation in the tire thickness direction reduces most at the center position of the contact surface. It is assumed that the timings when the acceleration due to tire deformation acquired by the acceleration sensor arranged on the inner circumference becomes minimum are the timing when the above described rotation angle θ is 180 degree, 540 degree, 900 degree and so forth. From such timings when the rotation angle θ is 180 degree, 540 degree, 900 degree and so forth, the rotation angle θ of the rotating tire can be obtained.

Figure 13:
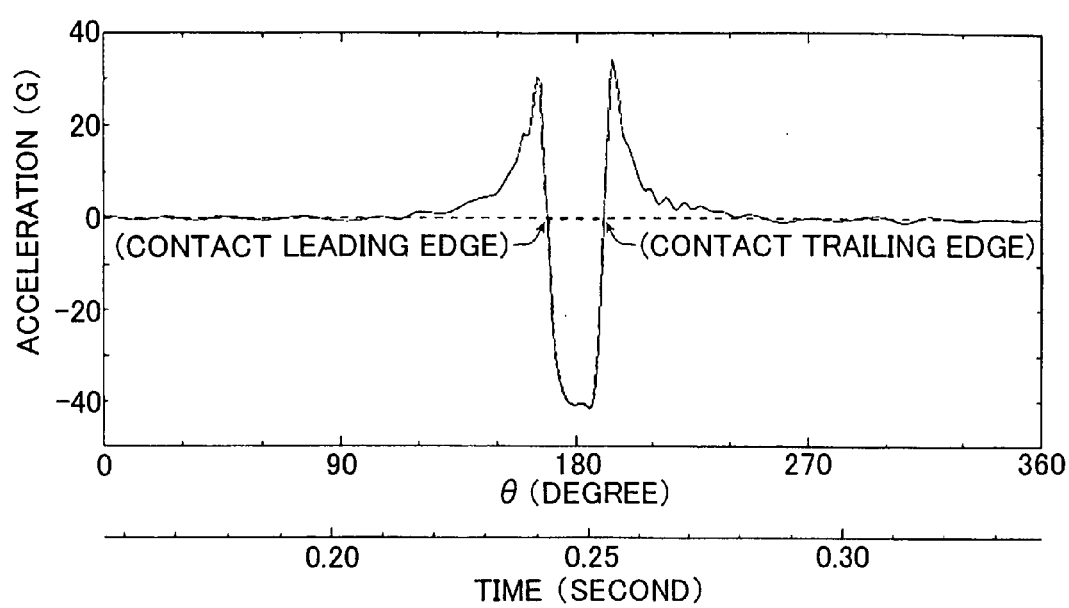
FIG. 13 is an enlarged view of a part of deformation acceleration time series data in the tire radial direction shown in FIG. 12C.

Next, the contact timing deriving section 26 derives, based on the time series data of acceleration in the tire radial direction due to tire deformation, the timing when the outer surface position 13 of the tire 15 rotating on the traveling road is made in contact with the traveling road surface, and the timing when the outer surface position 13 is made out of contact with the contact road surface (step S126). FIG. 13 is an enlarged view of a part of the time series data of deformation acceleration in the tire radial direction shown in FIG. 12C. The in-contact and out-of-contact timings can be extracted by obtaining 2 points at which the time series data of deformation acceleration derived in step S124 crosses an acceleration of zero, with a rapid change. The reason why the portions at which the time series data of acceleration changes rapidly can be determined as the contact leading edge and the contact trailing edge, is because the tire is rapidly deformed when the tread portion rotates to enter the contact region, and to exit the contact region.

Then, in the trajectory deriving section 28, the time series data of acceleration in the tire width direction, and the time series data of acceleration in the tire circumferential direction, due to tire deformation are subjected to time integration to obtain time series deformation displacement of the outer surface position 13. In this way, the trajectory in XYZ-space of the outer surface position 13 of the tire 15 which is rotating on the traveling road surface can be derived in detail (step S128).

Figure 14A:
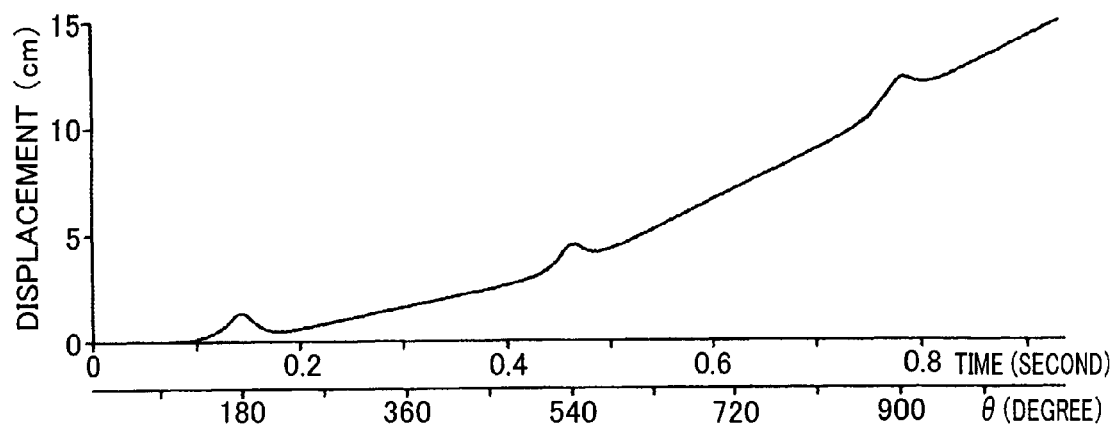
FIGS. 14A-14C are graphs each schematically showing the processing result in the rotation trajectory computing unit.
Figure 14B:
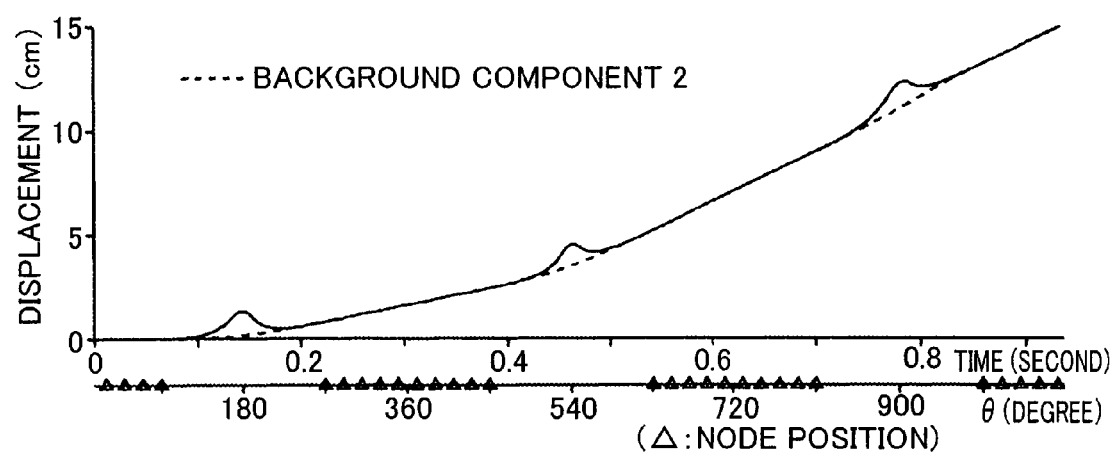
Figure 14C:
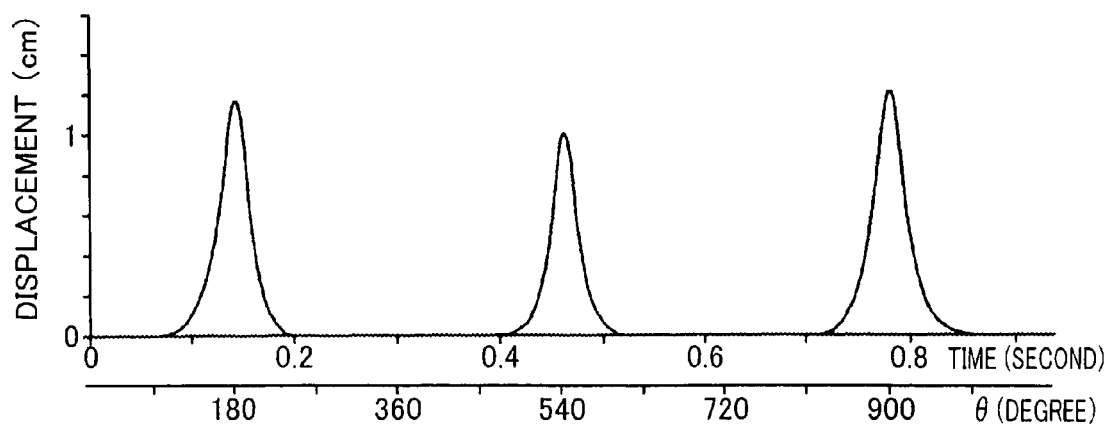

FIGS. 14A-14C are graphs each schematically showing the processing result in the trajectory deriving section 28 in step S128. The graphs shown in FIGS. 14A-14C are the processing results of the deformation acceleration time series data in the tire radial direction. In the trajectory deriving section 28, the deformation acceleration time series data is subjected to time integration of second order to generate displacement data. FIG. 14A shows a result of integration of second order with respect to time, performed on the time series data of acceleration (deformation acceleration time series data) in which the background component 1 has been removed in the data processing unit. As shown in FIG. 14A, it is observed that displacement increases with time. This is because, the time series data of acceleration to be subjected to integration contains noise components and those noise components are increasingly accumulated through integration. In general, if deformation or displacement at a given point of the tread portion of a tire that is rotating in a steady manner is observed, cyclical changes are typically demonstrated with the tire rotation cycle as a unit. This means, as a general rule, displacement does not increase with time. Therefore, in order to allow the displacement data obtained through time integration of second order to demonstrate cyclical changes with the tire rotation cycle as a unit, the following processes are carried out on the displacement data.

In other words, noise components contained in the displacement data are calculated as the background component 2 in a similar manner as used for calculating the background component 1. In this case, by using the above described time series rotation angle θ, the deformation of the tire during rotation in a region including the contact region with the road surface can be obtained with accuracy. Specifically, a region of the tire circumference is divided into a first region including the contact region in contact with a road surface and a second region including other than the first region. The regions which are defined as the first region include a region having a θ of greater than 90 degree and less than 270 degree, a region having a θ of greater than 450 degree and less than 720 degree, and a region having a θ of greater than 810 degree and less than 990 degree. On the other hand, the regions that are defined as the second region include a region having a θ of equal to or greater than 0 degree and equal to or less than 90 degree, and equal to or greater than 270 degree and equal to or less than 360 degree; a region having a θ of equal to or greater than 360 degree and equal to or less than 450 degree, and equal to or greater than 630 degree and equal to or less than 720 degree; and a region having a θ of equal to or greater than 720 degree and equal to or less than 810 degree, and equal to or greater than 990 degree and equal to or less than 1070 degree. The background component 2 is obtained by using a plurality of positions (θ, or time corresponding to θ) on the circumference in the second region as nodes so as to calculate a second approximation curve on the data in the first and second regions through least squares method using a set of predetermined functions. The nodes provide constraint conditions on the horizontal axis, that give local curvatures (jog) of the spline functions. FIG. 14B shows the second approximation curve representing the background component 2 with a dotted line. In the example shown in FIG. 14B, the positions as indicated by "Δ" in FIG. 14B, that is, the positions of time where θ is 10 degree, 30 degree, 50 degree, 70 degree, 90 degree, 270 degree, 290 degree, 310 degree, 330 degree, 350 degree, 370 degree, 390 degree, 410 degree, 430 degree, 450 degree, 630 degree, 650 degree, 670 degree, 690 degree, 710 degree, 730 degree, 750 degree, 770 degree, 790 degree, 810 degree, 990 degree, 1010 degree, 1030 degree, 1050 degree, and 1070 degree are defined as the node positions.

By carrying out function approximation on the data shown in FIG. 14A with the third-order spline functions routing through the above described nodes, a second approximation curve as indicated by dotted lines in FIG. 14B is calculated. When carrying out function approximation, there are no nodes in the first regions, and only the plurality of nodes in the second regions are used. In least squares method that is carried out in conjunction with the function approximation, the weighting coefficient for the second region is set to 1, and the weighting coefficient for the first regions is set to 0.01. The reason why the weighting coefficient for the first regions is smaller than the weighting coefficient for the second regions, and no nodes are set in the first regions in calculating the background component 2, is to calculate the background component 2 by using the displacement data mainly in the second regions. In the second regions, because deformation of the tread portion due to contact is small and such deformation changes smoothly on the circumference, the tire deformation is small on the circumference and such changes are also extremely small. In contrast, in the first regions, the tire tread portion is greatly displaced based on deformation due to contact and changes rapidly. For this reason, the deformation due to contact is great on the circumference and changes rapidly. In other words, the deformation of the tread portion in the second region is substantially constant as compared to the first deformation. Accordingly, by calculating the second approximation curve mainly using the displacement data obtained in the second regions through integration of second order, the deformation of the rotating tire can be obtained accurately, not only in the second regions, but also in the first regions including the contact region. FIG. 14B shows the second approximation curve calculated mainly using the displacement data in the second regions with dotted lines. In the second regions, the second approximation curve substantially coincides with the displacement data (solid lines).

Then the approximation curve calculated as the background component 2 is subtracted from the displacement data, so that the distribution of deformation on the circumference of the tread portion due to contact deformation is calculated. FIG. 14C shows the distribution of deformation of the tread portion due to contact, calculated by subtracting the second approximation curve (dotted line) from the displacement signal (solid line) shown in FIG. 14B. FIG. 14C shows the distribution of deformation when the predetermined measurement positions on the tread portion rotate and displace on the circumference, for a duration corresponding to three rounds of tire rotation (three times of contact). As is observed, the deformation changes at each contact. The deformation obtained in this manner accurately coincides with the deformation obtained through simulation using finite element models of the tire. In this way, the relationship between tire rotation angle θ (and time) and deformation displacement in the tire radial direction as shown n FIG. 14C can be obtained. Similar processes can be used to obtain the relationship between tire rotation angle θ (and time) and deformation displacement in the tire width direction, and the relationship between tire rotation angle θ (and time) and deformation displacement in the tire circumferential direction.

Figure 15A:
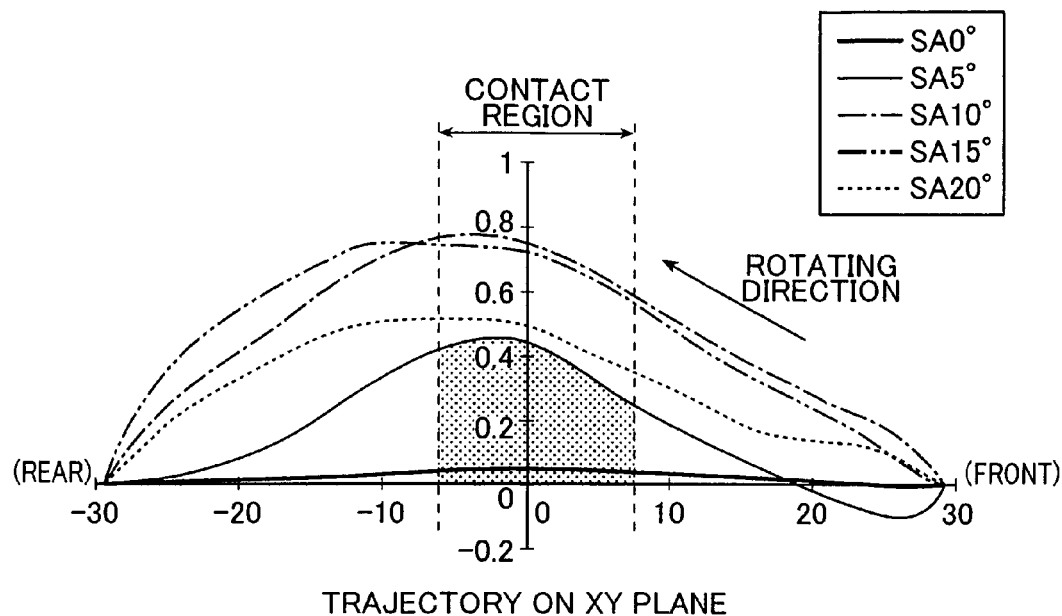
FIGS. 15A and 15B are graphs showing an trajectory of the acceleration sensor fixed to the tire, which is obtained with a known indoor cornering test device and calculated based on the deformation acceleration data of the tire.
Figure 15B:
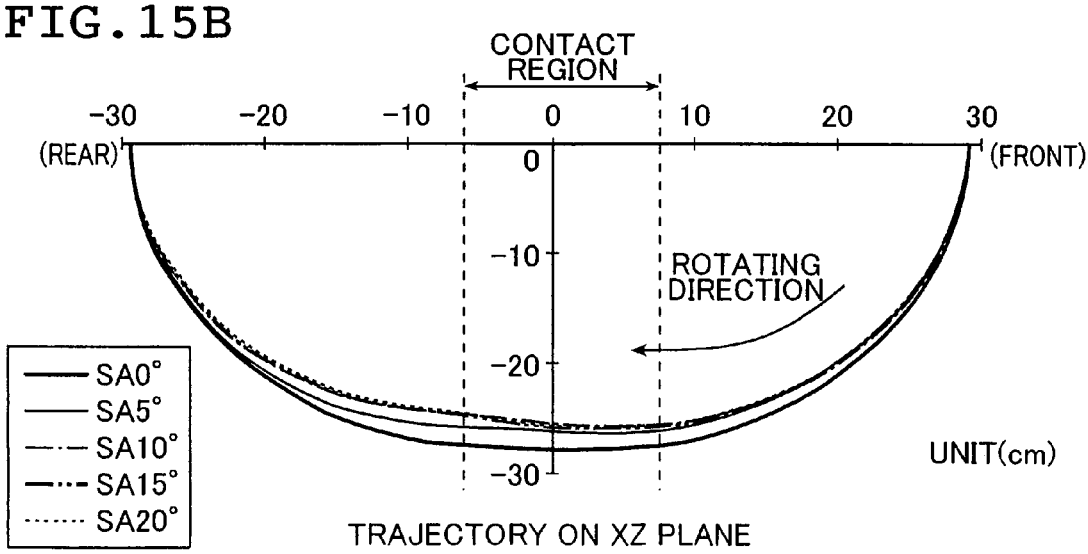

In the manner described above, in the trajectory deriving section 28, the displacement in the tire radial direction, displacement in the tire width direction, and displacement tire circumferential direction of the outer surface position 13 of the tire, with respect to the tire rotation angle are obtained. FIGS. 15A and 15B are graphs showing the trajectory on the XYZ-space of a predetermined portion (acceleration sensor fixing position) of the tire, which is obtained with a known indoor cornering test device and calculated using the acceleration data due to tire deformation. In the graphs shown in FIGS. 15A and 15B, the positions of the predetermined portion of the tire are converted into an orthogonal coordinate system based on the displacement of the predetermined portion of the tire with respect to the tire rotation angle. FIG. 15A shows an trajectory of the acceleration sensor 2 represented by a coordinate system composed of X direction and Y direction. FIG. 15B shows an trajectory of the acceleration sensor 2 represented by a coordinate system composed of Y direction and Z direction. In step S124, the trajectory deriving section 28 derives the rotation trajectory of the outer surface position 13 of the tire 15, and transmits the derived rotation trajectory to the deformation area deriving section 32.

Subsequently, the deformation area deriving section 32 calculates the deformation area representing the size of the deformation of the tire 15 in the contact region, based on the in-contact and out-of-contact timings of the outer surface position 13, and the trajectory of the outer surface position 13 (step S129). Specifically, the time series deformation displacement in the tire width direction derived by the trajectory deriving section 28 is integrated from the in-contact timing of the outer surface position 13 to the out-of-contact timing of the outer surface position 13 derived by the contact timing deriving section 26. In this manner, the deformation area of the tire 15 as indicated by a hatched portion in FIG. 4B is calculated in the deformation area deriving section 32. The deformation area thus obtained corresponds to the area of the shaded region in the graphs shown in FIG. 15A.

As described above, this relationship between deformation area and time is valid with accuracy for cornering in which the time and the slip angle of the wheel are in a proportional relationship. For example, the relationship is valid with accuracy when, with the steering angle being fixed, the traveling speed is increased at a constant increase rate (with a constant increase amount per unit of time), or when, with the traveling speed being fixed, the steering angle is increased at a constant increase rate (with a constant increase amount per unit of time ). For example, the relationship is valid with accuracy when a general passenger vehicle or truck vehicle travels a corner with a cornering radius being constant (e.g., 100R), such as at a highway entrance or junction, while gradually increasing the speed (e.g., 50 km/h→60 km/h→80 km/h→). Or, the relationship is valid with accuracy, when a general passenger vehicle or truck vehicle travels a compound curve of a general road, in which the cornering radius gradually reduces (cornering radius reduces 80R→50R→30R, for example), while maintaining a constant speed (50 km/h) which is lower than legal speed (e.g., 60 km/h).

The deformation area obtained in this manner accurately coincides with the deformation area obtained through simulation using finite element models of the tire. In this embodiment, the deformation area is calculated as described above. For example, when a general passenger vehicle or truck vehicle, travels on a general road or highway, the deformation area may be derived at every unit of time (e.g., 0.5 sec). In case of a general passenger vehicle or truck vehicle, the wheel of the vehicle is well in the low steering region at a point 0.5 sec after the start of cornering, and at the same time, the tire has rotated at least one round. Therefore, if the unit of time is set to, for example, 0.5 sec, the wheel of the vehicle is well in the low steering region, and the tire has rotated at least one round, so that the deformation area can be calculated. The calculated deformation area is stored in the memory 27. It should be noted that the unit of time is not limited to 0.5 sec. For example, when the passenger vehicle travels a high speed corner, of such as a racing circuit, with a high speed (e.g., over 100 km/h), the unit of time may be set to a shorter time frame. In the present invention, any suitable values can be set as the unit of time, according to measurement conditions (such as traveling conditions of the vehicle, conditions of the tire, conditions of measurement apparatus, and the like).

If the deformation area calculated in step S104 is the one calculated first after the vehicle 12 has started cornering (the determination result in step S106 is YES), the process returns to step S104, and next calculation of deformation area is performed. If the deformation area calculated in step S104 is the one calculated second or later, after the vehicle 12 has started cornering (the determination result in step S106 is NO), the derived deformation area is stored in the memory 27, as well as transmitted to the first calculating section 34.

Then, the first calculating section 34 uses the deformation area received this time and the deformation area calculated and stored in the memory 27 last time, to calculate the change ratio in the deformation area (step S108). Specifically, the first calculating section 34 receives the deformation area which is calculated and transmitted at every unit of time from the deformation area deriving section 32, and retrieves the deformation area stored last time (one unit of time before) from the memory 27. Then the deformation area received this time is divided by the deformation area calculated last time to calculate the change ratio in the deformation area (deformation amount in the deformation area per unit of time).

If the change ratio in the deformation area calculated in step S108, is the one first calculated after the vehicle 12 has started cornering (the determination result in step S110 is YES), the calculated change ratio in the deformation area is stored in the memory 27 as a reference value (step S112). And then the process returns to step S104, and subsequent processes are repeated. If the change ratio in the deformation area calculated in step S108 is the one calculated second or later, after the vehicle 12 has started cornering (the determination result in step S110 is NO), the derived change ratio in the deformation area is transmitted to the rate of change ratio calculating section 36.

Then, the second calculating section 36 receives the change ratio (change ratio in the deformation area) transmitted from the first calculating section 34, and uses the received change ratio and the reference value to calculate the rate of change ratio (step S114). Specifically, the second calculating section 36, each time when receiving the change ratio transmitted from the first calculating section 34 at every unit of time, retrieves the reference value stored in the memory 27 last time, and divide the change ratio received this time by the reference value to calculate the rate of change ratio.

In the present invention, the reference value is not limited to the change ratio calculated first after the vehicle has started cornering. For example, the reference value may be the change ratio calculated second or third after the vehicle has started cornering. However, it is preferable for the reference value to be the change ratio value in the low steering region, and to be the change ratio value calculated within 0.5 sec after the start of cornering. Also, it is more preferable for the reference value to be the value calculated first after the vehicle has started cornering. Alternatively, the reference value may be an average of a plurality of change ratio values which are calculated within a predetermined time or within a predetermined number of times after the vehicle has started cornering. In this case, it is also preferable for the reference value to be calculated based on the change ratio in the low steering region. And it is preferable for the predetermined time to be, for example, 1.0 sec., and for the predetermined number of times to be, for example three times. When a general passenger vehicle or truck vehicle is traveling a local street or highway (for example, a case where a vehicle with a tire having a tire circumferential length of approximately 2.0 m (195/65R15) travels on a highway at a speed of 80 km/h), the wheel of the vehicle is well in the low steering region and the tire has rotated at least 3-5 times at a point of 1.0 sec. after the start of cornering. If the above predetermined time is set to, for example, 1.0 sec., the deformation area can be calculated a plurality of times while the wheel is well in the low steering region, so that the rate of change ratio according to the deformation area in the low steering region can be calculated a plurality of times. The rate of change ratio calculated in the second calculating section 36 is stored in the memory 27 as well as transmitted to the determining section 38. It should be noted that the above predetermined time is not limited to 1.0 sec. And the predetermined number of times is not limited to three times. In the present invention, the above predetermined time and the above predetermine number of times may be set to any suitable values according to measurement conditions (vehicle traveling conditions, measurement apparatus conditions).

The determining section 38, each time when the rate of change ratio value is transmitted by the second calculating section 36, determines whether or not the transmitted rate of change ratio is lower than the predetermined threshold (step S116). The threshold value may be, for example, 0.60. That is, when the above rate of change ratio (refer to FIG. 9) becomes below 0.60, it may be determined that the vehicle 12 has a higher possibility of entering a slip state. If the rate of change ratio in the low steering region is approximately 1.0, and the rate of change ratio value is lower than 0.6, it is determined that the wheel state is about to enter the high steering region. If it is desirable to determine that the vehicle 12 has a higher possibility of entering a slip state at a stage when the wheel state is about to the middle steering region, the threshold may be set to, for example, 0.88.

If the result of the determination in step S116 is NO, the process returns to step S104, and subsequent processes are repeated. If the result of the determination in step S116 is YES, the determining section 38 causes the display 40 to generate a warning screen to inform the driver that the cornering stability of the vehicle is reduced to have a higher possibility of entering a slip state (step S118). The processes from step S104-step S116 are performed repeatedly, until the end of cornering (until the result of the determination in step S120 becomes YES). For example, the processes may be repeated until the measurement result by the cornering start detection means 18 is 0, and the vehicle 12 is in a linear traveling state.

According to the wheel cornering stability evaluating method and the wheel cornering stability evaluating apparatus of the present invention, it is possible to know what traveling conditions cause the vehicle to enter a slip state, when driving the vehicle to make cornering under various traveling conditions. This allows evaluation of the cornering stability (safety margin to reach slip state) of wheels that are actually mounted to a vehicle, with consideration of various factors associated with the actual vehicle. The evaluation results can be displayed on the display 40 to inform the vehicle's driver of the wheel cornering stability (safety margin to reach slip state) on a real time basis, when the vehicle is cornering.

In addition, determination results from the wheel cornering stability evaluating apparatus can be utilized for the purpose of controlling vehicles. For example, a vehicle controlling device may be configured, in which if the rate of change ratio becomes lower than the threshold when a vehicle is cornering, the vehicle is controlled so as not to further increase, or to reduce the slip angle, and thereby preventing the vehicle from sliding. In such vehicle controlling devices, the slip angle may be reduced by reducing the traveling speed, or by reducing the steering angle of the wheel.

In addition, using the vehicle cornering stability apparatus of the present invention enables quantitative and qualitative evaluation of the wheel stability. For example, tire-specific cornering stability may be evaluated quantitatively by investigating the speed at which the rate of change ratio becomes lower than the threshold. In the evaluation, the vehicle may be driven by only changing the speed, and leaving other conditions (such as conditions of the vehicle to which the tire is mounted, conditions of steering angle) remained the same. Alternatively, the same vehicle may be driven under the same traveling conditions, with changing the tire a plurality of times. A tire with which the rate of change ratio becomes lower than the threshold may be determined to have insufficient cornering performance.

In the practice of the present invention, by providing a plurality of acceleration sensors on the inner circumference surface of the tread portion, circumferentially (in the tire circumference direction), contact states at a plurality of positions on the circumference of the tread portion can be obtained simultaneously. In addition, providing a plurality of acceleration sensors in the tire width direction enables the obtaining of the contact length and the distribution of the contact regions in the width direction, so that the contact shape of the rotating tire can be acquired. Also, providing a plurality of acceleration sensors on the inner circumference surface of the tread portion, circumferentially, as described above, enables the acquisition of the distribution of the forces in the tire circumferential direction, generated on the contact region of the wheel. Providing a plurality of acceleration sensors in the tire width direction, enables the obtaining of the distribution in the tire width direction of the cornering forces generated in the contact region of the wheel.

While the wheel cornering stability evaluating method and the wheel cornering stability evaluating apparatus have been described thus far in detail, it should be understood that the present invention is not limited to the above embodiments, and rather covers all modifications equivalents, and alternatives without departing from the spirit of the invention.

The invention claimed is:

1. A method of evaluating a cornering stability of a wheel that is mounted to a vehicle and has a tire assembled thereto, when the vehicle is cornering on a road surface, the method comprising:

a deriving step of deriving a cumulative value of lateral displacement at a predetermined portion of the tire due to lateral deformation of an outer circumference surface portion of the tire when the vehicle is cornering, the cumulative value representing a resultant of an accumulation of the lateral displacement from a contact leading edge to a contact trailing edge of the tire, and the cumulative value of displacement being derived continually at every unit of time;

a first calculating step of repeatedly calculating, each time when the cumulative value of displacement is derived, a change amount in the cumulative value of displacement for the unit of time as a change ratio in tire deformation by using the cumulative value of displacement derived present time and the cumulative value of displacement derived last time;

a second calculating step of calculating, each time when the change ratio is calculated, a rate of change ratio in tire deformation, the rate of change ratio being calculated using the change ratio in tire deformation previously calculated as a reference value and the change ratio calculated present time; and a determining step of determining, based on the rate of change ratio calculated in the second calculating step, a cornering stability of the wheel that represents a degree of a margin in which the wheel keeps no sliding and beyond which the wheel start sliding.

2. The method of evaluating a cornering stability if the wheel according to claim 1, wherein the cumulative value of displacement is derived by using acceleration data in a tire width direction at a predetermined portion of the tire, due to lateral deformation of the tire measured by an acceleration sensor attached to a position corresponding to the predetermined portion of the tire, in the deriving step.

3. The method of evaluation a cornering stability of the wheel according to claim 2, wherein the acceleration sensor is attached to a tire inner circumference surface that faces a tire cavity region at a tread portion of the tire.

4. The method of evaluation a cornering stability of the wheel according to claim 2, wherein the method includes a data acquiring step of acquiring, when the vehicle is cornering, acceleration data in a tire radial direction at a predetermined portion of the tire, due to contact deformation of the outer circumference surface portion of the tire during rotation of the tire, and acceleration data in a tire width direction at a predetermined portion of the tire, due to lateral deformation of the outer circumference surface portion of the tire during cornering of the vehicle, respectively, and, wherein the deriving step includes:

obtaining, based on the acceleration data in the tire radial direction, a timing at which the predetermined portion is made in contact with the road surface, and a timing at which the predetermined portion is made out of contact with the road surface;

subjecting the acceleration data in the tire width direction to time integration of second order to obtain time series data of the lateral displacement of the tire at the predetermined portion of the tire due to deformation in the tire lateral direction; and accumulating the time series data of displacement from the timing at which the predetermined portion is made in contact with the road surface to the timing at which the predetermined portion is made out of contact with the road surface, thereby deriving the accumulative value of the displacement.

5. The method of evaluation a cornering stability of the wheel according to claim 4, wherein the deriving step obtains two timings at which the acceleration data in the tire radial direction at the predetermined portion of the tire due to deformation of the outer circumference surface portion of the tire crosses 0 and uses the obtained two timings as the timings at which the predetermined portion is made in contact with and out of contact with the road surface.

6. The method of evaluation a cornering stability of the wheel according to claim 1, wherein the second calculating step uses as the reference value the change ration in tire deformation that is calculated first after the vehicle has started cornering to calculate the rate of change ratio.

7. The method of evaluation a cornering stability of the wheel according to claim 1, wherein the determining step compares the rate of change ratio calculated in the second calculating step to a predetermined threshold and, if the rate of change ratio is lower than the threshold, determines that a degree of a risk that the wheel reaches a sliding state is high.

8. An apparatus for evaluating a cornering stability of a wheel that is mounted to a vehicle and has a tire assembled thereto, when the vehicle is cornering on a road surface, the apparatus comprising:

a memory capable of storing digit information;

a deriving unit that derives and stores in the memory, a cumulative value of lateral displacement at a predetermined portion of the tire due to lateral deformation of an outer circumference surface portion of the tire when the vehicle is cornering, the cumulative value representing a resultant of an accumulation of the lateral displacement from a contact leading edge to a contact trailing edge of the tire, and the cumulative value of displacement being derived continually at every unit of time;

a first calculating section that receives the derived cumulative value of displacement each time when the cumulative value of displacement is derived, retrieves the cumulative value of displacement that is derived last time and stored in the memory, and uses the cumulative value of displacement that is derived present time and the cumulative value of displacement that is derived last time so as to repeatedly calculate a change amount in the cumulative value of displacement for a unit of time as a change ratio in tire deformation;

a second calculating section that receives the change ratio in tire deformation, each time when the change ratio in tire deformation is derived, uses the change ratio calculated last time as a reference value, and repeatedly calculates a rate of change ratio in tire deformation calculated present time with respect to the reference value; and a determination unit that receives the rate of change ratio in tire deformation calculated in the second calculating section, and based on the rate of change ratio, determines a cornering stability of the wheel that represents a degree of a margin in which the wheel keeps no sliding and beyond which the wheel start sliding.

9. The apparatus for evaluating a cornering stability of the wheel according to claim 8, wherein the apparatus fui4hef includes detecting means for detecting that the vehicle has started cornering when the vehicle is traveling;

wherein the first calculating section stores in the memory, as the reference value, the change ratio in tire deformation calculated first after the detecting means has detected that the vehicle has started cornering, and wherein the second calculating section retrieves, each time when the change ratio in tire deformation is calculated, the reference value from the memory so as to calculate the rate of change ratio.

10. The apparatus for evaluating a cornering stability of the wheel according to claim 8, wherein the determining section compares the rate of change ratio calculated in the second calculating section to a predetermined threshold, and if the rate of change ratio is lower than the threshold, determines that a risk that the wheel reach a sliding state is high.

\* \* \* \* \*

UNITED STATES PATENT AND TRADEMARK OFFICE
CERTIFICATE OF CORRECTION

PATENT NO. : 7,469,578 B2  Page 1 of 1
APPLICATION NO. : 11/525667
DATED : December 30, 2008
INVENTOR(S) : Matsuda et al.

It is certified that error appears in the above-identified patent and that said Letters Patent is hereby corrected as shown below:

| Column | Line | Description of Error |
|---|---|---|
| 1 | 4 | Add the sentence below the title section, "The entire contents of literatures cited in this specification are incorporated herein by reference." |
| 1 | 45 | Change "(e.g.,drum" to --(e.g., drum--. |
| 3 | 10 | Change "time,;" to --time;--. |
| 4 | 4 | Change "An" to --an--. |
| 5 | 10 | Change "invention ;" to --invention;--. |
| 6 | 3 | Change "level )" to --level)--. |
| 10 | 49 | Change "time(present" to --time (present--. |
| 11 | 25 | After "FIG. 5" insert --.--. |
| 18 | 54-55 | Change "time )." to --time).--. |
| 20 | 4 | Change "0.5 sec" to --0.5 sec.--. |
| 22 | 23 | In Claim 2, change "if" to --of--. |
| 23 | 5 | In Claim 6, change "change ration" to --change ratio--. |
| 24 | 18 | In Claim 9, after "apparatus" delete "fui4hef". |
| 24 | 20 | In Claim 9, change "traveling;" to --traveling,--. |

Signed and Sealed this

First Day of September, 2009

David J. Kappos
*Director of the United States Patent and Trademark Office*